US009021077B2

(12) United States Patent
Nagai et al.

(10) Patent No.: US 9,021,077 B2
(45) Date of Patent: Apr. 28, 2015

(54) MANAGEMENT COMPUTER AND METHOD FOR ROOT CAUSE ANALYSIS

(75) Inventors: Takayuki Nagai, Machida (JP); Masataka Nagura, Yokohama (JP); Kiminori Sugauchi, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 13/380,590

(22) PCT Filed: Sep. 26, 2011

(86) PCT No.: PCT/JP2011/071800
§ 371 (c)(1),
(2), (4) Date: Dec. 23, 2011

(87) PCT Pub. No.: WO2013/046287
PCT Pub. Date: Apr. 4, 2013

(65) Prior Publication Data
US 2013/0080624 A1  Mar. 28, 2013

(51) Int. Cl.
*G06F 15/173* (2006.01)
*G06F 11/07* (2006.01)
(52) U.S. Cl.
CPC .......... *G06F 11/0709* (2013.01); *G06F 11/079* (2013.01)
(58) Field of Classification Search
USPC ............. 709/224; 702/183, 181, 185; 706/47; 707/726
See application file for complete search history.

(56) References Cited

U.S. PATENT DOCUMENTS

| 7,003,433 | B2 * | 2/2006 | Yemini et al. ................. 702/183 |
| 7,043,661 | B2 | 5/2006 | Valadarsky et al. |
| 7,107,185 | B1 | 9/2006 | Yemini et al. |
| 8,271,492 | B2 * | 9/2012 | Nagai et al. .................. 707/736 |
| 2005/0137832 | A1 * | 6/2005 | Yemini et al. ................. 702/183 |
| 2008/0120400 | A1 * | 5/2008 | Keller et al. .................. 709/223 |
| 2009/0313198 | A1 * | 12/2009 | Kudo et al. ..................... 706/47 |
| 2011/0314330 | A1 | 12/2011 | Morimura et al. |

FOREIGN PATENT DOCUMENTS

| JP | 2011-175357 A | 9/2011 |
| WO | WO 2010122604 A1 * | 10/2010 |
| WO | 2011/104767 A1 | 9/2011 |

* cited by examiner

*Primary Examiner* — Kyung H Shin
(74) *Attorney, Agent, or Firm* — Volpe and Koenig, P.C.

(57) ABSTRACT

In analyzing an elaborate computer system which requires large-scale or numerous event propagation models, a law-of-causality matrix gains size, so that significant amount of storage resources has been used in a management computer. To solve such a problem, the management computer to manage the computer system stores topologies, event propagation models, and causality information including one or more causal relations in the storage resources, determines, when the management computer analyzes or detects an event, whether a causal relation has already been created for the event to be analyzed, and creates the causal relation based on a topology and event propagation models, if not yet.

18 Claims, 29 Drawing Sheets

| | 13310 | 13320 | 13330 | 13340 | 13300 |
|---|---|---|---|---|---|
| | DRIVE LETTER | iSCSI INITIATOR NAME | CONNECTED iSCSI TARGET NAME | LUN ID | |
| | E: | com.hitachi.sv1 | com.hitachi.sto1 | 0 | |
| | F: | com.hitachi.sv11 | com.hitachi.sto1 | 1 | |
| | : | | : | : | |

FIG. 6A

| | 13310 | 13320 | 13330 | 13340 | 13300 |
|---|---|---|---|---|---|
| | DRIVE LETTER | iSCSI INITIATOR NAME | CONNECTED iSCSI TARGET NAME | LUN ID | |
| | E: | com.hitachi.sv2 | com.hitachi.sto2 | 0 | |
| | : | | : | : | |

FIG. 6B

| | 13310 | 13320 | 13330 | 13340 | 13300 |
|---|---|---|---|---|---|
| | DRIVE LETTER | iSCSI INITIATOR NAME | CONNECTED iSCSI TARGET NAME | LUN ID | |
| | E: | com.hitachi.sv3 | com.hitachi.sto3 | 0 | |
| | : | | : | : | |

FIG. 6C

| ID 23410 | TARGET ID 23420 |
|---|---|
| PORT1 | TG1, TG2 |
| PORT2 | TG3 |
| : | : |

| RAID GROUP ID 23510 | RAID LEVEL 23520 | MEMBER DISK DRIVE ID 23530 | CAPACITY 23540 |
|---|---|---|---|
| RG1 | RAID1 | DISK1, DISK2 | 100GB |
| RG2 | RAID1 | DISK3, DISK4 | 100GB |
| : | : | : | |

| DISK DRIVE ID 23610 | DISK TYPE 23620 |
|---|---|
| DISK1 | FC |
| DISK2 | S-ATA |
| DISK3 | FC |
| DISK4 | FC |
| : | : |

| EVENT ID | APPARATUS ID | COMPONENT ID | EVENT TYPE | PROCESSED FLAG | OCCURRENCE DATE AND TIME | EVENT EXPIRATION DATE AND TIME |
|---|---|---|---|---|---|---|
| EV1 | HOST1 | E: | ABNORMAL STATE | YES | 2010-01-01 15:00:00 | 2010-01-01 15:30:00 |
| EV2 | SYS1 | TG1 | CHANGE | NO | 2010-01-01 15:05:00 | - |
| EV3 | HOST3 | E: | CHANGE | NO | 2010-01-01 15:05:00 | - |
| EV4 | SYS1 | DISK1 | ABNORMAL STATE | NO | 2010-01-01 16:00:00 | - |
| EV5 | SYS1 | DISK2 | ABNORMAL STATE | NO | 2010-01-01 16:10:00 | - |
| .. | .. | .. | .. | .. | .. | .. |

FIG. 12

| | | 33200 |
|---|---|---|
| 33210 | MODEL ID | RULE1 |
| 33220 | MONITORED EVENT TYPE | HOST COMPUTER LOGICAL VOLUME ABNORMAL STATE, STORAGE SYSTEM VOLUME ABNORMAL STATE |
| 33230 | CAUSATIVE EVENT TYPE | STORAGE SYSTEM VOLUME FAILURE |

FIG. 13A

| | | 33200 |
|---|---|---|
| 33210 | MODEL ID | RULE2 |
| 33220 | MONITORED EVENT TYPE | STORAGE SYSTEM VOLUME FAILURE, STORAGE SYSTEM RAID GROUP ABNORMAL STATE, STORAGE SYSTEM DISK DRIVE ABNORMAL STATE |
| 33230 | CAUSATIVE EVENT TYPE | STORAGE SYSTEM DISK DRIVE FAILURE |

FIG. 13B

| EVENT PROPAGATION MODEL ID | | | Rule1 | | | | ... |
|---|---|---|---|---|---|---|---|
| CAUSATIVE EVENT | | | SYS1 | | | | ... |
| MONITORED EVENT | | | VOL1 | VOL2 | VOL3 | VOL5 | ... |
| | | | FAILURE | FAILURE | FAILURE | FAILURE | ... |
| SYS1 | VOL1 | ABNORMAL STATE | O | - | - | - | ... |
| | VOL2 | ABNORMAL STATE | - | O | - | - | ... |
| | VOL3 | ABNORMAL STATE | - | - | O | - | ... |
| | VOL5 | ABNORMAL STATE | - | - | - | O | ... |
| HOST1 | E: | ABNORMAL STATE | O | - | - | - | ... |
| | F: | ABNORMAL STATE | - | O | - | - | ... |
| HOST2 | E: | ABNORMAL STATE | - | - | O | - | ... |
| HOST3 | E: | ABNORMAL STATE | - | - | - | O | ... |
| : | : | : | : | : | : | : | ... |

FIG. 14A

| EVENT PROPAGATION MODEL ID | | | Rule2 | | | | ... |
|---|---|---|---|---|---|---|---|
| CAUSATIVE EVENT | | | SYS1 | SYS1 | SYS1 | SYS1 | ... |
| | | | DISK1 | DISK2 | DISK3 | DISK4 | ... |
| MONITORED EVENT | | | FAILURE | FAILURE | FAILURE | FAILURE | ... |
| SYS1 | RG1 | ABNORMAL STATE | O | O | - | - | ... |
| | RG2 | ABNORMAL STATE | - | - | O | O | ... |
| SYS1 | VOL1 | FAILURE | O | - | - | - | ... |
| | VOL2 | FAILURE | - | O | - | - | ... |
| | VOL3 | FAILURE | - | - | O | - | ... |
| | VOL5 | FAILURE | - | - | - | O | ... |
| SYS1 | DISK1 | ABNORMAL STATE | O | - | - | - | ... |
| | DISK2 | ABNORMAL STATE | - | O | - | - | ... |
| | DISK3 | ABNORMAL STATE | - | - | O | - | ... |
| | DISK4 | ABNORMAL STATE | - | - | - | O | ... |
| : | : | : | : | : | : | : | ... |

FIG. 14B

| EVENT PROPAGATION MODEL ID | | | Rule1 | | ... |
|---|---|---|---|---|---|
| CAUSATIVE EVENT | | | SYS1 | | ... |
| | | | VOL1 | VOL2 | ... |
| MONITORED EVENT | | | FAILURE | FAILURE | ... |
| SYS1 | VOL1 | ABNORMAL STATE | O | - | ... |
| | VOL2 | ABNORMAL STATE | - | O | ... |
| HOST1 | E: | ABNORMAL STATE | O | - | ... |
| | F: | ABNORMAL STATE | - | O | ... |
| : | : | : | : | : | ... |

FIG. 14C

| EVENT PROPAGATION MODEL ID | | | Rule2 | | ... |
|---|---|---|---|---|---|
| CAUSATIVE EVENT | | | SYS1 | SYS1 | ... |
| | | | DISK1 | DISK2 | ... |
| MONITORED EVENT | | | FAILURE | FAILURE | ... |
| SYS1 | RG1 | ABNORMAL STATE | O | O | ... |
| SYS1 | VOL1 | FAILURE | O | - | ... |
| | VOL2 | FAILURE | - | O | ... |
| SYS1 | DISK1 | ABNORMAL STATE | O | - | ... |
| | DISK2 | ABNORMAL STATE | - | O | ... |
| : | : | : | : | : | ... |

FIG. 14D

| EVENT PROPAGATION MODEL ID | | | Rule1 | | ... |
|---|---|---|---|---|---|
| | | CAUSATIVE EVENT | SYS1 | | ... |
| MONITORED EVENT | | | VOL1 | VOL2 | ... |
| | | | FAILURE | FAILURE | ... |
| SYS1 | VOL1 | ABNORMAL STATE | O | - | ... |
| | VOL2 | ABNORMAL STATE | - | - | ... |
| HOST1 | E: | ABNORMAL STATE | O | - | ... |
| | F: | ABNORMAL STATE | - | - | ... |
| : | : | : | : | : | ... |

FIG. 14E

| | | |
|---|---|---|
| | TOPOLOGY ID | TP1 |
| 33410 | STARTING COMPONENT | STORAGE SYSTEM VOLUME |
| 33420 | TERMINAL COMPONENT | HOST COMPUTER LOGICAL VOLUME |
| 33430 | TRANSIT COMPONENT | STORAGE SYSTEM iSCSI TARGET |
| 33440 33450 | TOPOLOGY CREATION CONDITION | (LOGICAL VOLUME. iSCSI INITIATOR NAME) = (iSCSI TARGET. ACCESSIBLE iSCSI INITIATOR NAME), (VOLUME. iSCSI TARGET ID)= (iSCSI TARGET. ID), (LOGICAL VOLUME. LUN ID)= (VOLUME. LUN ID) |

| | | |
|---|---|---|
| | TOPOLOGY ID | TP2 |
| 33410 | STARTING COMPONENT | STORAGE SYSTEM RAID GROUP |
| 33420 | TERMINAL COMPONENT | STORAGE SYSTEM VOLUME STORAGE SYSTEM DISK DRIVE |
| 33430 | TRANSIT COMPONENT | - |
| 33440 33450 | TOPOLOGY CREATION CONDITION | (VOLUME. RAID GROUP ID) = (RAID GROUP. ID), (RAID GROUP. DISK DRIVE ID) = (DISK DRIVE. ID) |

| APPARATUS TYPE | COMPONENT TYPE | EVENT TYPE | APPLICABLE EVENT PROPAGATION MODEL ID |
|---|---|---|---|
| HOST COMPUTER | LOGICAL VOLUME | ABNORMAL STATE | Rule1 |
| STORAGE SYSTEM | RAID GROUP | ABNORMAL STATE | Rule2 |
| STORAGE SYSTEM | DISK DRIVE | ABNORMAL STATE | Rule2 |
| STORAGE SYSTEM | VOLUME | ABNORMAL STATE | Rule1 |
| STORAGE SYSTEM | VOLUME | FAILURE | Rule1, Rule2 |
| STORAGE SYSTEM | DISK DRIVE | FAILURE | Rule2 |
| : | : | : | : |

FIG. 18

| 33710 | 33720 | 33730 | 33740 | 33700 |
|---|---|---|---|---|
| APPARATUS ID | COMPONENT ID | STATE | STATUS | |
| HOST1 | E: | ABNORMAL STATE | EXPANDED | |
| SYS1 | VOL1 | FAILURE | EXPANDED | |
| SYS1 | VOL5 | ABNORMAL STATE | EXPANDING | |
| : | : | : | : | |

FIG. 22

| 33810 | 33820 | 33830 | 33840 | 33800 |
|---|---|---|---|---|
| APPARATUS ID | COMPONENT ID | RULE ID | STATUS | |
| SYS1 | VOL1 | Rule1 | EXPANDED | |
| SYS1 | RG1 | Rule2 | EXPANDED | |
| SYS1 | VOL5 | Rule3 | EXPANDING | |
| : | : | : | : | |

FIG. 23

MANAGEMENT COMPUTER AND METHOD FOR ROOT CAUSE ANALYSIS

BACKGROUND

This invention relates to a program for managing a computer system.

U.S. Pat. No. 7,107,185 B1 discloses a management server that determines the cause of a problem which occurs to a component managed in a computer system. More specifically, the management program in U.S. Pat. No. 7,107,185 B1 defines various faults in managed apparatuses as events and accumulates the information in an event database. This management program has an analytic engine to analyze the causal relationships of a plurality of error events which occur to a plurality of managed apparatuses.

The analytic engine accesses a configuration DB including inventory information on the managed apparatuses and recognizes the components in the managed apparatuses on a path of I/O channels as a group. The relationship among the managed apparatuses or the components in a single or a plurality of managed apparatuses is referred to as topology. The analytic engine applies error propagation models (IF-THEN rules) composed of predetermined conditional sentences and analysis results to the topology to create a causality matrix.

The causality matrix includes a causative event which is the cause of an error in a different apparatus and associated event groups caused by the causative event. Specifically, the event listed as the root cause of an error in the THEN part in the error propagation model are the causative event and the events other than the causative event listed in the IF part are the associated events.

SUMMARY

The technique disclosed in U.S. Pat. No. 7,107,185 B1 creates a causality matrix based on all the managed apparatuses and all the error propagation models before starting event analysis. For this reason, the causality matrix for analyzing an elaborate computer system requiring large-scale or numerous error propagation models gains size, so that a significant amount of storage resources of the management computer (such as a memory and/or a secondary storage device) is used.

In order to solve the foregoing problem, a management computer for managing a computer system stores topologies, event propagation models, and causality information including one or more causal relations in its storage resources and, when the management computer analyzes or detects an event, determines whether a causal relation for the event to be analyzed has already been created, and if not yet, creates the causal relation based on the topology and an event propagation model. An example of the causality information is the above-described causality matrix.

According to the above-described means, the management computer can analyze an elaborate computer system which requires large-scale or numerous error propagation models with less storage resources.

BRIEF DESCRIPTION OF THE DRAWINGS

FIG. 6A is a drawing illustrating a configuration of a logical volume management table included in a host computer;

FIG. 6B is a drawing illustrating a configuration of a logical volume management table included in a host computer;

FIG. 6C is a drawing illustrating a configuration of a logical volume management table included in a host computer;

FIG. 9 is a drawing illustrating a configuration of an I/O port management table included in a storage system;

FIG. 10 is a drawing illustrating a configuration of a RAID group management table included in a storage system;

FIG. 11 is a drawing illustrating a configuration of a disk drive management table included in a storage system;

FIG. 12 is a drawing illustrating a configuration of an event management table included in a management computer;

FIG. 13A is a drawing illustrating a configuration of an event propagation model included in a management computer;

FIG. 13B is a drawing illustrating a configuration of an event propagation model included in a management computer;

FIG. 14A is a drawing illustrating a configuration of a law-of-causality matrix included in a management computer;

FIG. 14B is a drawing illustrating a configuration of a law-of-causality matrix included in a management computer;

FIG. 14C is a drawing illustrating a configuration of a law-of-causality matrix included in a management computer;

FIG. 14D is a drawing illustrating a configuration of a law-of-causality matrix included in a management computer;

FIG. 14E is a drawing illustrating a configuration of a law-of-causality matrix included in a management computer;

FIG. 15A is a drawing illustrating a configuration of a topology creation method included in a management computer;

FIG. 15B is a drawing illustrating a configuration of a topology creation method included in a management computer;

FIG. 18 is a drawing illustrating a configuration an event propagation model expansion management table included in a management computer;

FIG. 22 is a drawing illustrating a configuration an expanded event management table included in a management computer;

FIG. 23 is a drawing illustrating a configuration an expanded starting component management table included in a management computer;

DETAILED DESCRIPTION OF THE PREFERRED EMBODIMENTS

Hereinafter, embodiments of this invention will be explained with reference to the accompanying drawings. In the following explanation, information in the embodiments will be expressed as "aaa table", "aaa list", "aaa DB", "aaa queue", "aaa matrix" or the like; however, the information may be expressed in data structures other than tables, lists, DBs, queues, matrices, and the like. For this reason, to imply independency from such data structures, the "aaa table", "aaa list", "aaa DB", "aaa queue", "aaa matrix" or the like may be referred to as "aaa information". Additionally, in explanation of the substances of the information, nominal designation such as identification information, identifier, letter, name, or ID are used; but they may be replaced with one another. Moreover, the term "information" is used to indicate substance of data, but it can be expressed in any other way. The term "repository" used in the description of the embodiments has the same meaning as information.

In the following explanation, descriptions will be provided with subjects of program but such descriptions may be replaced by those having subjects of processor because a program is executed by a processor to perform predetermined processing using a memory and a communication port (communication control apparatus). In addition, the processing disclosed by the descriptions having the subjects of program may be taken as the processing performed by a computer or an information processing apparatus such as a management computer or a storage system. A part or the entirety of a program may be implemented by dedicated hardware. Various programs may be installed in computers through a program distribution server (comprising storage resources for storing installation images of the programs and a CPU for executing distribution) or a storage medium.

Figure 27:
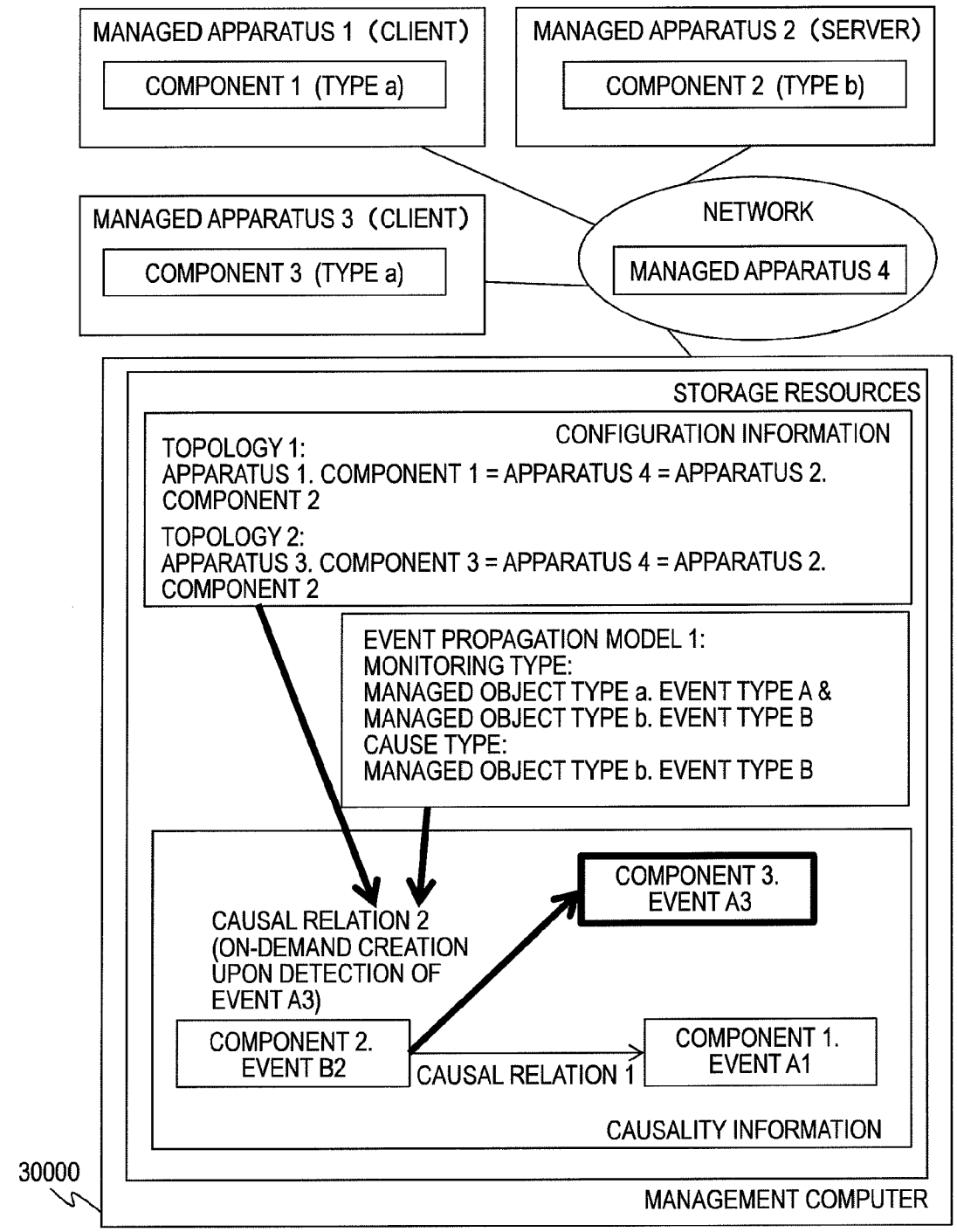
FIG. 27 is a schematic drawing illustrating an outline of an embodiment.

FIG. 27 is a drawing illustrating the outline of Embodiment 1. A management computer 30000 is a computer for managing a plurality of apparatuses 10000. The managed apparatuses can be classified into host computers, network apparatuses such as IP switches and routers, NASs, and storage apparatuses. A logical or physical element such as a device included in a managed apparatus is referred to as component. Examples of components are ports, processors, storage resources, storage devices, programs, virtual machines, and logical volumes and RAID groups defined in storage systems. To treat the managed apparatuses and the components without discrimination, they are inclusively referred to as managed objects.

The management computer 30000 acquires apparatus information such as configuration information and information indicating faults or performance on these managed apparatuses and displays management information (such as configuration information, presence or absence of a fault, and performance data) of the managed apparatuses based on the acquired apparatus information.

Some of the managed apparatuses are servers for some network service (such as iSCSI, file sharing service, DNS, and other web services) and some of the managed apparatuses use the network service provided by these servers as clients. In this situation, if any problem relating to providing the service (for example, a fault or a performance trouble in a managed object) occurs to a managed apparatus (server), problems relating to managed objects occur to managed client apparatuses (also referred to as client apparatuses) using the service, too.

In the description hereinafter, the information indicating a problem which happens to a managed object in the management computer is referred to as event. A detection of an event means detecting an occurrence of a problem and creating event information. An occurrence of an event has the same meaning as an occurrence of a problem.

The management computer 30000 can analyze a problem which happened to a managed apparatus to determine that the cause of the problem is a problem which happened to another managed apparatus and display the result. For such a purpose, the management computer 30000 stores the information listed below and uses it in the analysis.

Configuration information: The configuration information contains information indicating the configuration (also referred to as inventory) of managed apparatuses. The configuration information includes information on components included in each managed apparatus and relations among the managed objects such as relations among components. Furthermore, the configuration information on client apparatuses includes identification information on server apparatuses (or the components of the server apparatuses) to receive a network service. For example, in the case of the network service to provide volumes by later-described iSCSI protocol, a client apparatus accesses a volume provided by a storage system while designating an iSCSI target name and a LUN as identification information. In another case of web, it designates a URL including the name of a web server as the identification information to access the web page.

The configuration information on server apparatuses may include identification information on client apparatuses which access the server apparatuses. Such a relation among a plurality of managed objects in a managed apparatus or in a plurality of managed apparatuses is called topology.

Information of one or more event propagation models (hereinafter, simply referred to as event propagation models): This information includes one or more monitoring type pairs and a cause type pair. Details of the pairs are as follows.

Cause type pair: A pair of a type of managed objects (also referred to as causal managed object type) and a type of events (causal event type). The causal event type is a type of events which may occur to a managed object identified by the causal managed object type.

Monitoring type pair: A pair of a type of managed objects (also referred to as monitored managed object type) and a type of events (monitored event type). The monitored event type is a type of events which may occur to a managed object identified by the monitored managed object type. The monitoring type pair indicates the type of an event which occurs along with an event identified by a cause type pair.

It is preferable that an event in a cause type pair be the cause in the case of detection of all events in the relevant monitoring type pairs included in an event propagation model, but it does not need to be.

To be more specific about the analysis by the management computer 30000, the management computer creates causal relations in causality information, based on event propagation models and topologies, and then performs event analysis. A causal relation is information indicating that a first event occurring to a first managed object leads to a second event happening to a second managed object. It is preferable that a requirement to determine that the first event is the cause be that all the second events related to the first event are detected, but it does not need to be. The causality information may take a form of a law-of-causality matrix; otherwise, it may take a data structure which indicates the relations between first and second events using pointer information indicating such relations, as long as it can express the above-described substance.

The management computer 30000 creates a causal relation on demand, which means that the management computer 30000 determines whether a causal relation has been created in the causality information for a certain event which has been detected but has not been analyzed yet. If it has not been created yet, it creates a causal relation using the topology and the event propagation model related to the event and performs analysis on the event.

Examples of event analysis are as follows:

Determining an event 2 which causes a detected event 1. This determination can be made by referring to the causality information. The management computer (or a later-described management system) may display a message indicating that the event 1 has happened because of the event 2 on its own display device, together with the information on the event 1.

Determining an event 4 which happens (or may happen) because of a detected event 3. This determination can be made by referring to the causality information. The management computer (or the later-described management system) may display a message indicating that the event 4 happens (or may happen) because of the event 3 on its own display device.

Upon detection of an event, the management computer 30000 determines whether a causal relation relating to the detected event has already been created in the causality information. If not, it creates a causal relation (in the later-described explanation, also referred to as expand a causal relation) based on (1) an event propagation model including the detected event in the monitoring type pair or the cause type pair and (2) a topology relating to the component where the detected event has occurred. It should be noted that such expansion of a causal relation triggered by detection of an event is called on-demand expansion. The on-demand expansion achieves smaller size of causality information for event analysis even in a large-scale computer system or an elaborate computer system.

When the management computer 30000 detects a change, addition, or deletion in the configuration of some managed apparatus, some topology may be updated, added, or deleted. The management computer 30000 deletes the causal relations which have been created based on the updated or deleted topology from the causality information. Thereafter, it creates a causal relation relating to the updated topology by on-demand expansion. As to the added topology, the management computer 30000 creates a causal relation by the aforementioned on-demand expansion.

After a considerable time passes from the start of the analysis, various types of events are more likely to be detected from various managed objects. In such a circumstance, the size of the causality information increases because of the on-demand expansion. For this reason, the management computer 30000 may provide the events with valid periods, while removing expired events from the analysis and deleting the causal relations relating to the expired events from the causality information. Such an operation can reduce the size of the causality information.

The example of FIG. 27 illustrates an outline of on-demand creation of a causal relation when event A3 (type A) is actually detected in component 3 (type a) under the condition where event correlation 1 has already been created between event A1 (type A) occurring to component 1 (type a) and event B2 (type B) occurring to the component 2 (type b) that causes the event A1. The event correlation 1 is the one previously created on demand based on topology 1 and event propagation model 1 when the event A1 was detected in the past. In this situation, the management computer creates event correlation 2 on demand between the event A3 (type A) occurring to the component 3 (type a) and the event B2 (type B) occurring to the component 2 (type b) that causes the event A3 based on topology 2 and the event propagation model 1.

The trigger to delete a causal relation may be the following examples, but may include other examples.

When a management program detects a configuration change in some managed apparatus.

When the management program deletes the causal relation as repetitive operations with predetermined intervals.

Since the on-demand expansion creates a causal relation at the time of analysis of an event, load increases during the analysis. For this reason, for a specific event propagation model or a specific managed object, a causal relation may be expanded in advance. Such expansion of a causal relation in advance is called preliminary expansion. The time for "in advance" can be considered as (1) after the management program starts up and before it detects an event or (2) after the management program detects a configuration change in a managed apparatus and before it detects the next event, for example. However, it may be a different time as long as it is before detection of an event. The method of determining the event propagation model or managed object for preliminary expansion can be considered as (1) specifying the identifiers by a user in advance, (2) specifying the type of managed object as a requirement, or (3) specifying the type of the managed object or the event type included in an event propagation model as a requirement; however, it may be a different method.

In determination whether a causal relation has been created or in expansion of a causal relation, determining the relations between event propagation models and events while accessing each event propagation model takes time in proportion to the number of models. Accordingly, for reference in the determination, the management computer 30000 may preliminarily create a data structure with which it can identify the ID of an event propagation model including a particular pair of a managed object type and an event type in the cause type pair or the monitoring type pair with the pair of the type of the managed object and the type of the event which occurs to the managed object.

Described above is the outline of the embodiments of this invention. Hereinafter, the embodiments will be described with the following examples, but, of course, this invention is not limited to these.

- Network service: Storage access by iSCSI protocol. Client apparatuses are exemplified by host computers; server apparatuses, by storage systems.
- Causality information: Law-of-causality matrix
- Managed apparatuses: Host computers, IP switches, and storage systems
- Managed objects: Components
- Components: iSCSI targets, volumes, RAID groups, disk drives, drive letters of host computers
- Trigger for deleting a causal relation: Detection of a configuration change Embodiment 1

FIG. 1 to FIG. 5 illustrate an architecture of a computer system and architectures of apparatuses connected to the computer system. FIG. 6 to FIG. 15 illustrate management information included in the apparatuses.

Figure 1:
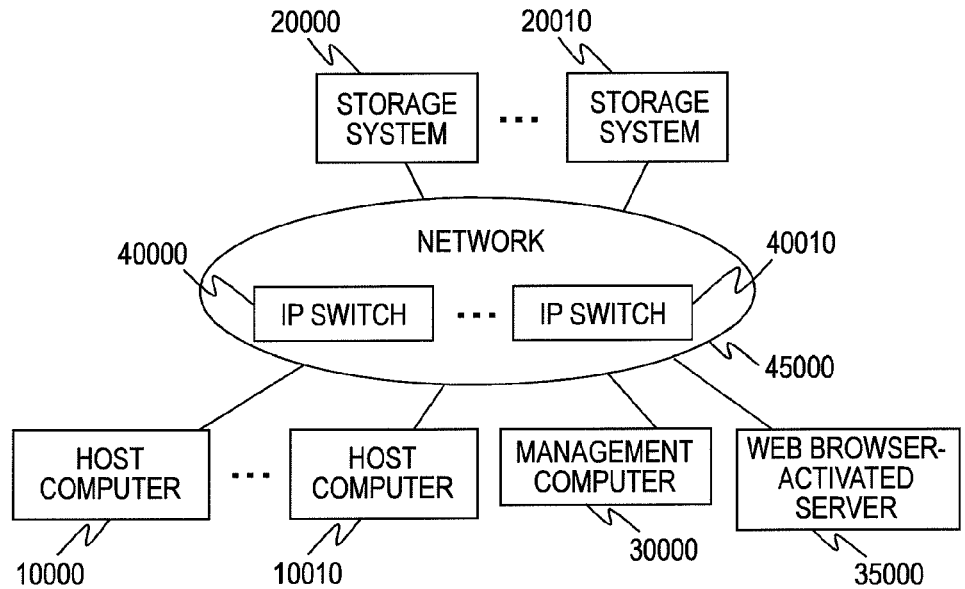
FIG. 1 is a drawing illustrating a physical architecture of a computer system.

FIG. 1 is a drawing illustrating a physical architecture of a computer system. The computer system comprises a storage system 20000, a host computer 10000, a management computer 30000, a web browser-activated server 35000, and an IP switch 40000; they are interconnected with a network 45000.

The host computers 10000 to 10010 receive I/O requests for files from not-shown client computers connected thereto and access the storage systems 20000 to 20010 based on the requests. The management computer (management server) 30000 manages operations of the overall computer system.

The web browser-activated server 35000 is a computer that communicates with a GUI engine 32300 in the management computer 30000 via the network 45000 and displays various kinds of information on the web browser. A user refers to the information displayed on the web browser in the web browser-activated server to manage the apparatuses in the computer system. It should be noted that the management computer 30000 and the web browser-activated server 35000 may be configured with one computer.

Figure 29:
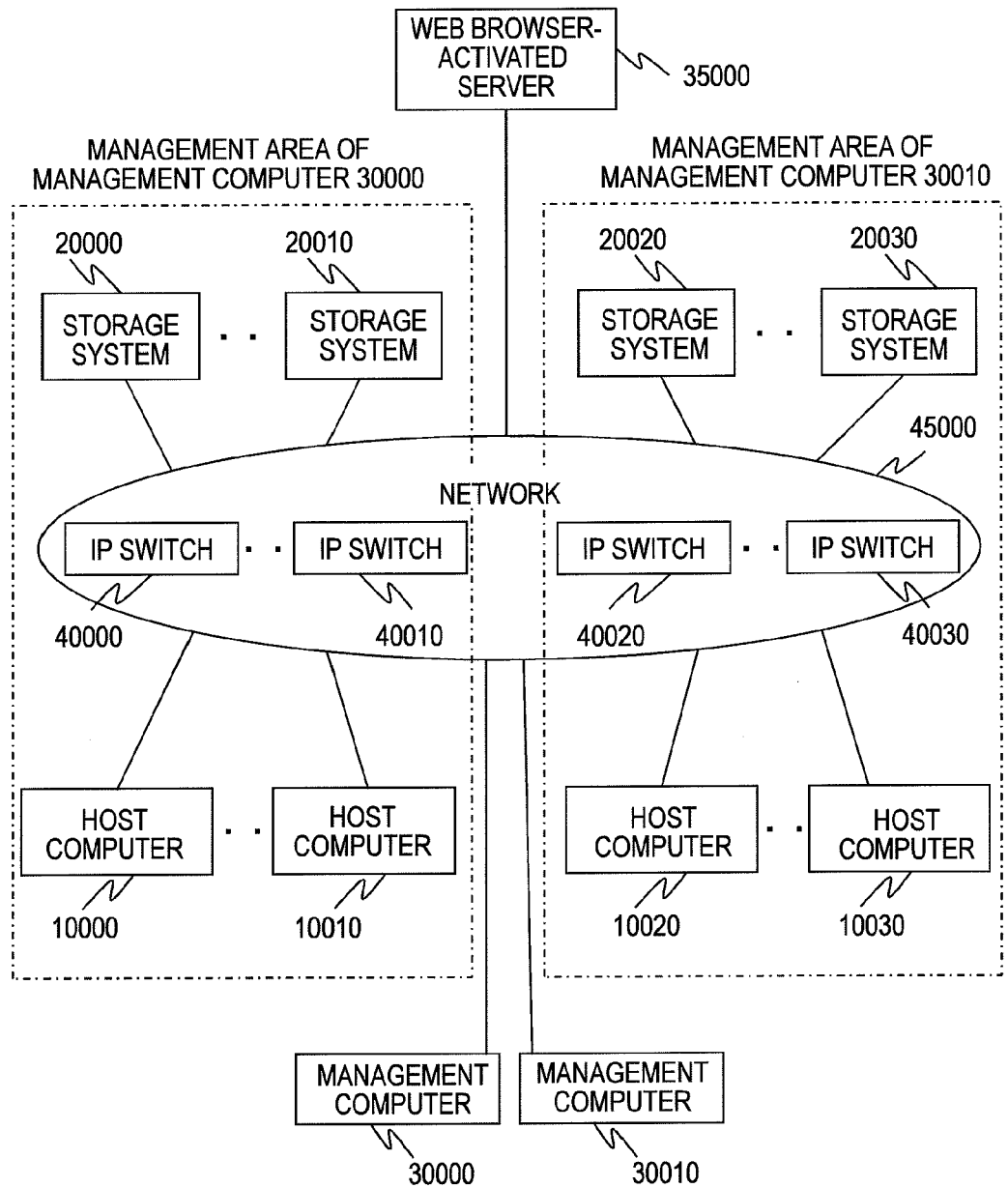
FIG. 29 is a drawing illustrating another physical architecture of a computer system.

In the meanwhile, as shown in FIG. 29, the computer system may include a plurality of management computers 30000, which can separately take charges of the apparatuses to be managed, such as storage systems 20000, host computers 10000, and management computers 30000.

Figure 2:
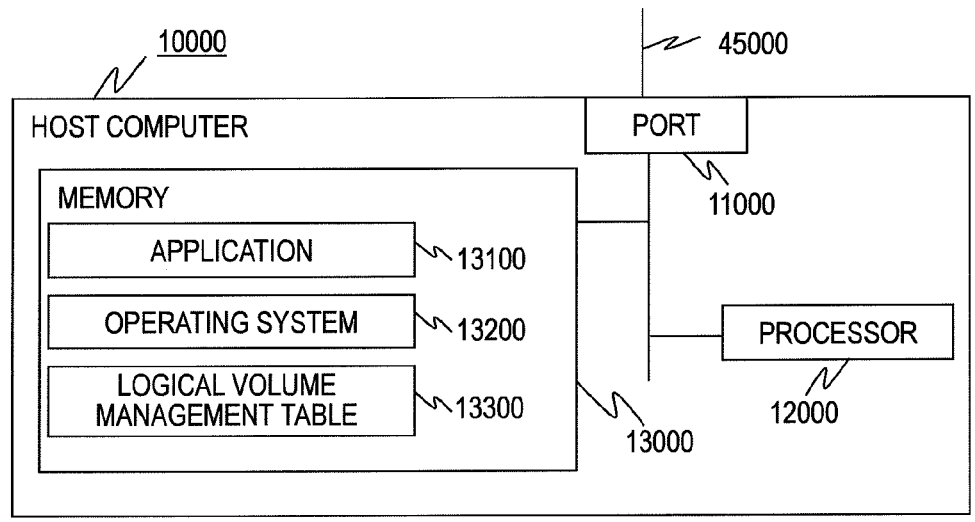
FIG. 2 is a drawing illustrating a detailed architecture of a host computer.

FIG. 2 is a drawing illustrating a detailed internal architecture of the host computer 10000 in this embodiment. The host computer 10000 comprises a port 11000 for connecting to the network 45000, a processor 12000, and a memory 13000 (which may include a disk apparatus); they are interconnected via a circuit such as an internal bus.

The memory 13000 stores an application program 13100, an operating system 13200, and a logical volume management table 13300.

The application program 13100 performs data inputs and outputs (hereinafter, denoted by I/O) to and from the storage areas provided by the operating system 13200.

The operating system 13200 performs processing for the application program 13100 to recognize logical volumes in the storage systems 20000 to 20010 connected to the host computer 10000 via the network 45000 as storage areas.

The port 11000 in FIG. 2 is illustrated as a single port including an I/O port to communicate with the storage system 20000 using iSCSI and a management port for the management computer 30000 to acquire management information in the host computer, but it may be separated into an I/O port for communication using iSCSI and a management port.

Figure 3:
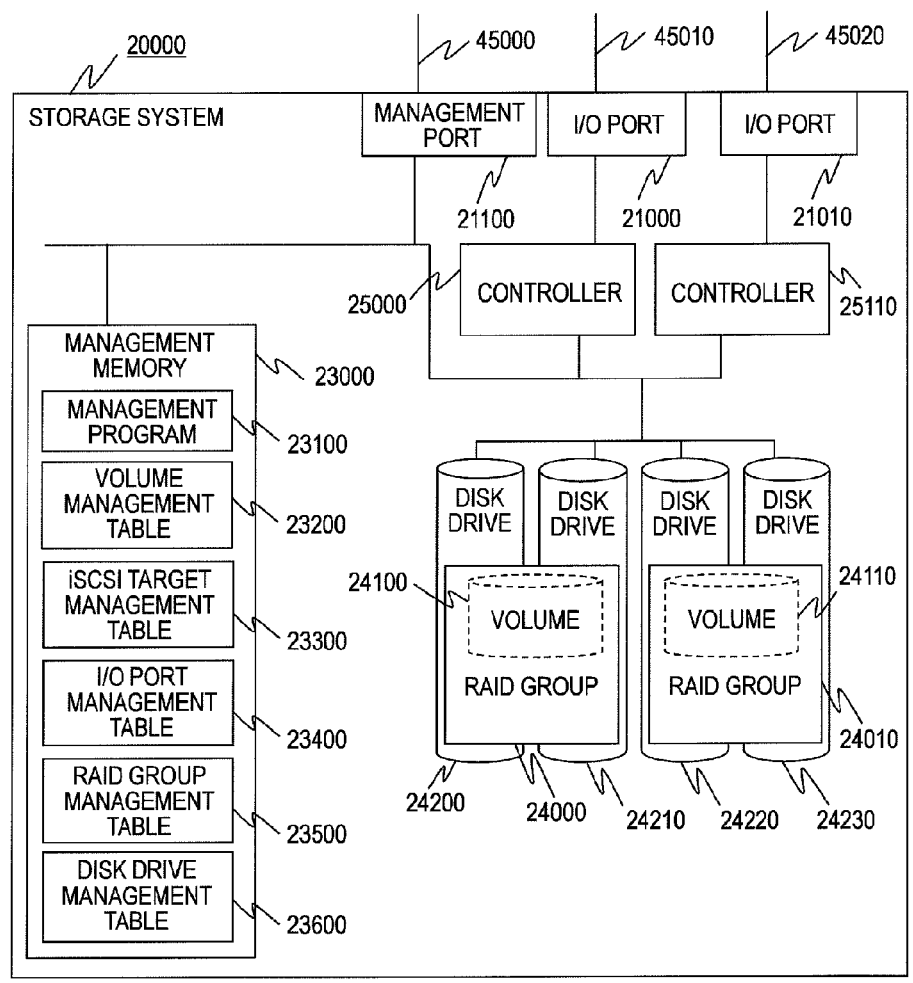
FIG. 3 is a drawing illustrating a detailed architecture of a storage system.

FIG. 3 is a drawing illustrating a detailed internal architecture of the storage system 20000 in this embodiment. The storage system 20010 has the same architecture.

The storage system 20000 comprises I/O ports 21000 and 21010 to be connected to the host computer 10000 via the network 45000, a management port 21100 to be connected to the management computer 30000 via the network 45000, a management memory 23000 for storing various kinds of management information, RAID groups 24000 to 24010 for storing data, and controllers 25000 and 25010 for controlling data and management information in the management memory; they are interconnected via a circuit such as an internal bus. Connection of the RAID groups 24000 to 24010 means, to be more precise, that storage devices that constitute the RAID groups 24000 to 24010 are connected to the other components.

The management memory 23000 stores a management program 23100 for the storage system, a volume management table 23200, an iSCSI target management table 23300, an I/O port management table 23400, a RAID group management table 23500, and a disk drive management table 23600. The management program communicates with the management computer 30000 via the management port 21100 to provide the management computer with the configuration information on the storage system 20000.

The RAID groups 24000 to 24010 each consist of one or more magnetic disk drives 24200, 24210, 24220, and 24230. In the case of a plurality of magnetic disk drives, the magnetic disk drives may be organized as a RAID system. The RAID groups 24000 to 24010 are logically separated into a plurality of volumes 24100 to 24110.

The logical volumes 24100 and 24110, however, do not need to be organized as a RAID system as long as they are configured with one or more storage areas of magnetic disk drives. Moreover, the magnetic disk drives can be substituted by storage devices using other storage media, such as flash memories, as long as they provide the logical volumes with storage areas.

The controllers 25000 and 25010 include processors for controlling the storage system 20000 and cache memories for temporarily storing data to be exchanged with the host computer 10000 inside thereof. The controllers are each located between an I/O port and the RAID groups to exchange data therebetween.

The storage system 20000 may have an architecture different from the one in FIG. 3 and the foregoing explanation as long as it includes a storage controller that provides logical volumes to any of the host computers, receives access requests (I/O requests), and reads from or writes to the storage devices in response to the received access requests, and the above-described storage devices for providing storage areas; for example, the storage controller and the storage devices for providing storage areas may be enclosed in different housings. Specifically, in the example of FIG. 3, the management memory 23000 and the controllers 25000 and 25110 may be the storage controller. In this description, to inclusively express both of the example which includes the storage controller and the storage device in the same housing and the example which provides them in separate housings, a storage apparatus is referred to as storage system.

Figure 4:
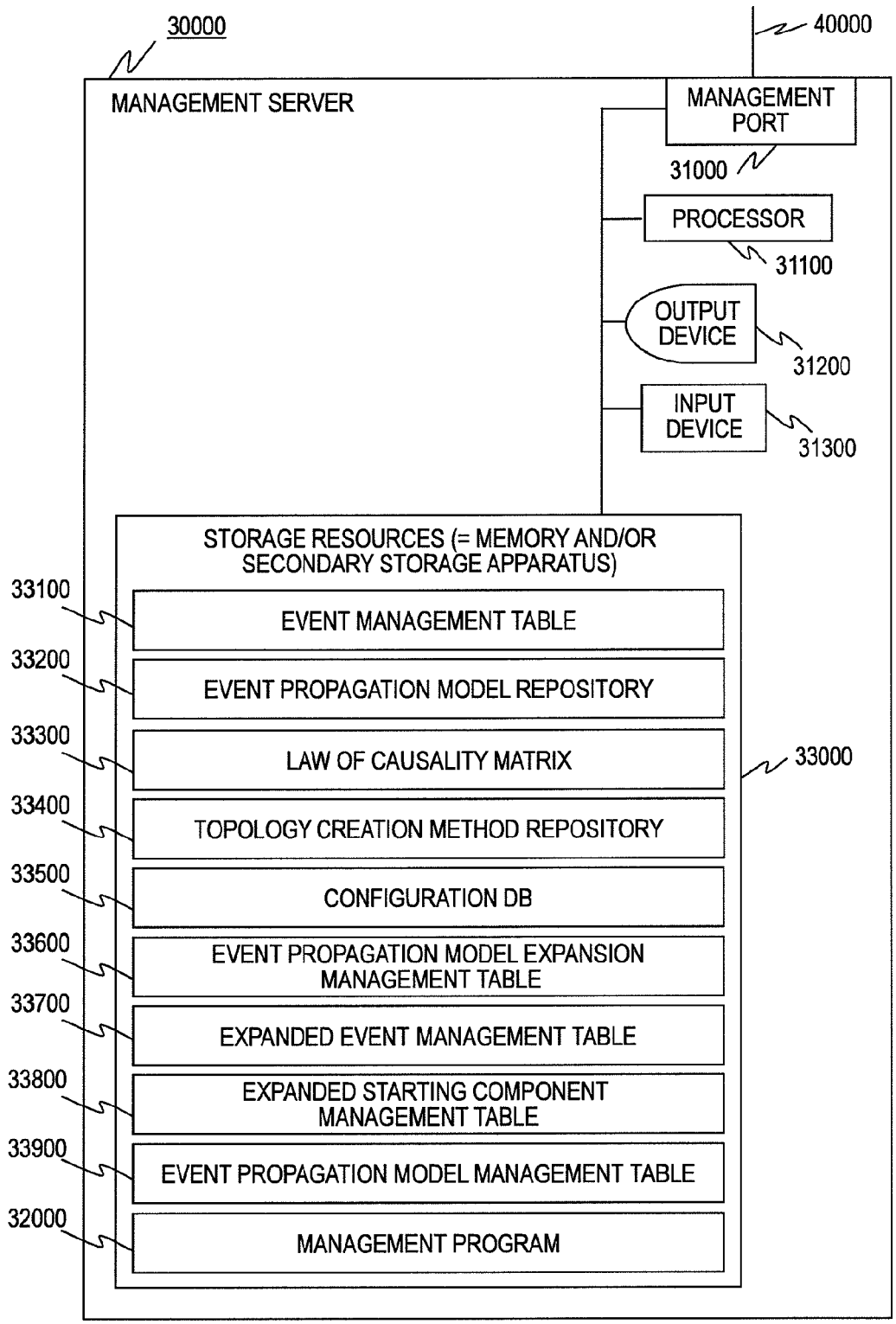
FIG. 4 is a drawing illustrating a detailed architecture of a management computer.
Figure 17:
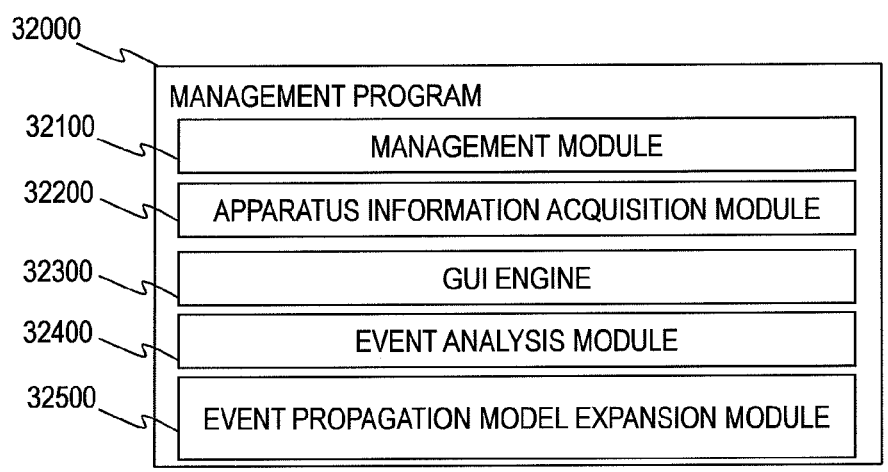
FIG. 17 is a drawing illustrating a logical architecture of a management program.

FIG. 4 and FIG. 17 are drawings illustrating a detailed internal architecture of the management computer 30000 in this embodiment. The management computer 30000 comprises a management port 31000 for connecting to the network 45000, a processor 31100, storage resources 33000, an output device 31200 such as a display device for outputting results of later-described processing, and an input device 31300 such as a keyboard for the storage administrator to input instructions; they are interconnected via a circuit such as an internal bus. The storage resources 33000 are a semiconductor memory or a storage device, or storage resources including the both of them.

The storage resources 33000 store a management program 32000. As illustrated in FIG. 17, the management program 32000 includes a management module 32100, an apparatus information acquisition module 32200, a GUI engine 32300, an event analysis module 32400, and an event propagation model expansion module 32500. These modules are provided for program modules of the storage resources 33000 but may be provided for hardware modules. The management program 32000 is not necessarily configured with the modules as long as the management program 32000 can perform operations of the modules. In other words, the description about each module can be replaced with description about the management program 32000.

The storage resources 33000 further store an event management table 33100, an event propagation model repository 33200, a law-of-causality matrix 33300, a topology creation method repository 33400, a configuration DB 33500, an event propagation model expansion management table 33600, an expanded event management table 33700, an expanded starting component management table 33800, and an event propagation model management table 33900. The configuration DB 33500 stores configuration information.

Examples of the configuration information are the contents of the logical volume management table 13300 the apparatus information acquisition module 32200 collects from the managed host computers, and the contents of the volume management table 23200, the iSCSI target management table 23300, the I/O port management table 23400, the RAID group management table 23500, and the disk drive management table 23600 the apparatus information acquisition module collects from the managed storage systems. The configuration DB does not need to store all the tables or all the contents of the tables in the managed apparatuses. The data format or data structure of the contents stored in the configuration DB does not need to be the same as those in the managed apparatuses. When the management program 32000 receives these contents from the managed apparatuses, the data structures or data formats may be the ones in the managed apparatuses.

The apparatus information acquisition module 32200 periodically or repetitively accesses the managed apparatuses in its administration to ascertain the states of the components in the managed apparatuses. The event analysis module 32400 analyzes an abnormal state in a managed apparatus detected by the apparatus information acquisition module 32200 to determine its root cause with reference to the law-of-causality matrix 33300.

The GUI engine 32300 displays the acquired apparatus information with the output device 31200 in response to a request from the administrator using the input device 31300. It should be noted that the input device and the output device may be separate devices or may be one or more united devices.

For example, the management computer (management server) includes a monitor, a keyboard, a pointer device, and the like as input and output devices, but the input and output devices may be different apparatuses. As an alternative of the input and output devices, the management computer may be connected to a display use computer (for example, the web browser-activated server 35000) including a monitor, a keyboard, or a pointer device through an interface such as a serial interface or an Ethernet interface. It transmits information to be displayed to the display use computer or receives information to be inputted from the display use computer for the display use computer to display or receive information, so that the display use computer can work as an alternative of the input and output devices.

In this description, a group of one or more computers that manages the computer system (information processing system) and displays information to be displayed may be called management system. In the case where the management computer displays information to be displayed, the management computer is the management system. Also, a combination of the management computer and a display use computer (for example, the web browser-activated server 35000 in FIG. 1) is the management system. A plurality of computers may perform operations equivalent to the operations by the management computer to enhance the speed or reliability of the management. In such a case, the plurality of computers (including the display use computer, if the display use computer displays information) are the management system.

Figure 5:
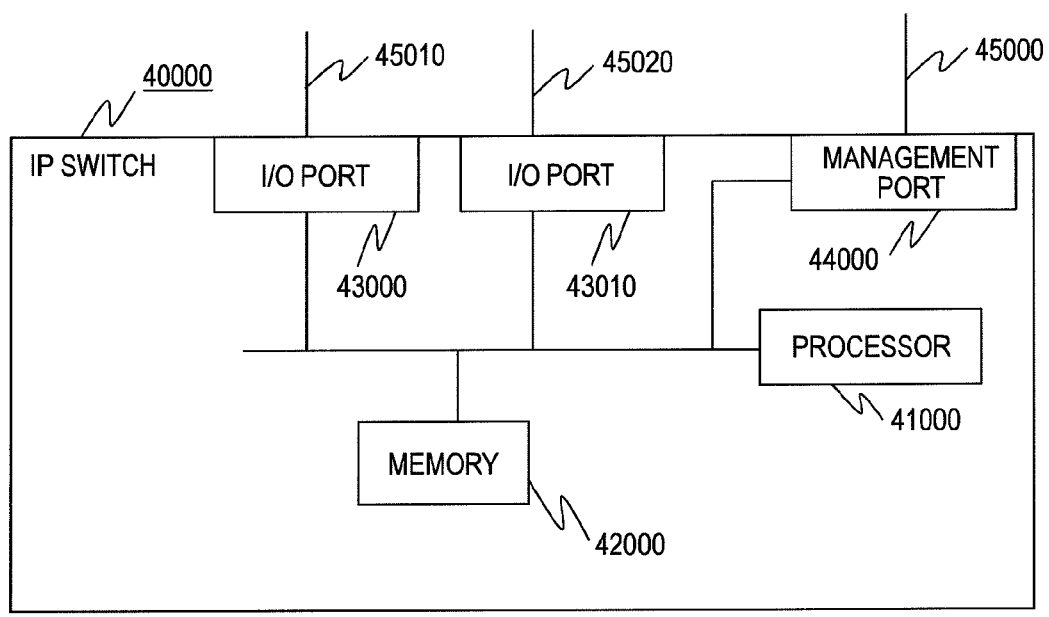
FIG. 5 is a drawing illustrating a detailed architecture of an IP switch.

FIG. 5 illustrates a detailed architecture of the IP switch 40000. The IP switch 40000 comprises a processor 41000, a memory 42000 for storing various kinds of management information, I/O ports 43000 and 43010 for connecting to the host computer 10000 via the networks 45010 and 45020, and a management port 44000 for connecting to the network 45000; they are interconnected via a circuit such as an internal bus. It should be noted that, instead of a semiconductor memory, a part or the entirety of the memory 42000 may be a different kind of storage medium, such as a magnetic disk.

FIGS. 6A, 6B, and 6C are drawings illustrating a configuration of the logical volume management table 13300 owned by the host computer 10000.

The logical volume management table 13300 includes a field 13310 for registering drive letters to be the identifiers of logical volumes in the host computer, a field 13320 for registering iSCSI initiator names to be the identifiers of I/O ports 11000 in the host computer used in communication with storage systems in which the substance of the logical volumes exist, a field 13330 for registering connected iSCSI target names to be the identifiers of I/O ports 21000 in the storage systems used in communication with the storage systems in which the substance of the logical volumes exist, and a field 13340 for registering LUN IDs to be the identifiers of logical volumes in the storage systems.

FIG. 6A shows an example of a set of specific values in the logical volume management table owned by a host computer, which indicates a logical volume designated by the drive letter "E:" in the host computer is connected to a storage system via a port designated by the iSCSI initiator name of com.hitachi.sv1 in the host computer and a port designated by the iSCSI target name of com.hitachi.sto1 and the logical volume has a LUN ID of 0 in the storage systems.

Figure 7:
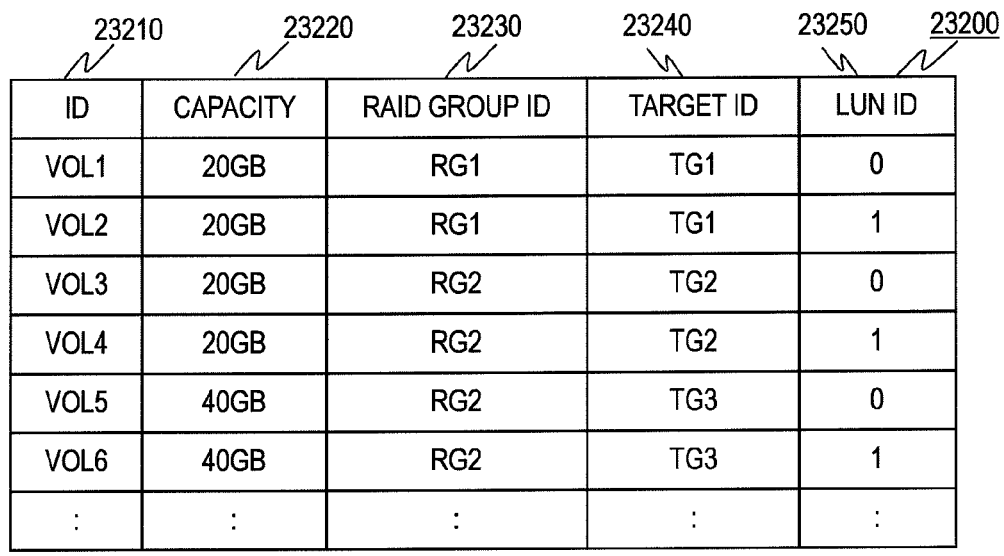
FIG. 7 is a drawing illustrating a configuration of a volume management table included in a storage system.

FIG. 7 is a drawing illustrating the volume management table 23200 owned by the storage system 20000.

The volume management table 23200 includes a field 23210 for registering volume IDs to be the identifiers of volumes in the storage system, a field 23220 for registering capacities of the volumes, a field 23230 for registering RAID group IDs to be the identifiers of RAID groups the volumes belonging to, a field 23240 for registering target IDs to be the identifiers of iSCSI targets the volumes belonging to, and a field 23250 for registering LUN IDs to be the identifiers of the volumes in the iSCSI targets.

FIG. 7 shows an example of a set of specific values in the volume management table owned by a storage system, which indicates a volume VOL1 in the storage system has a 20-GB storage area, belongs to an RAID group indicated by the RAID group ID of RG1, belongs to an iSCSI target indicated by the iSCSI target ID of TG1, and has a LUN ID of 0.

Figure 8A:
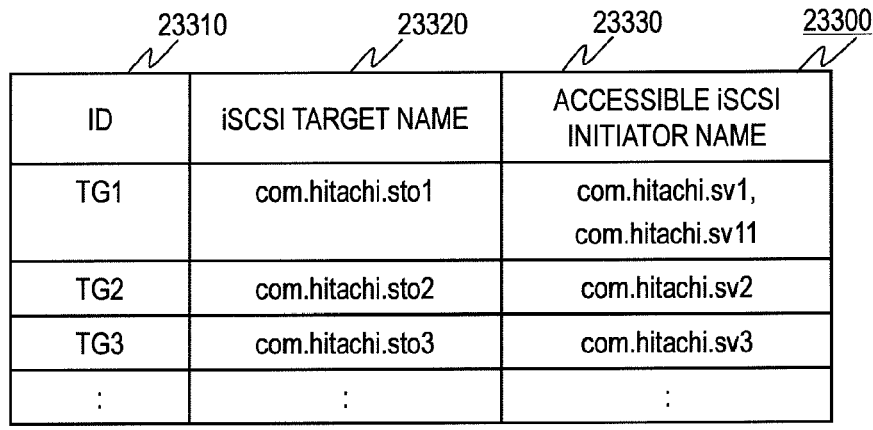
FIG. 8A is a drawing illustrating a configuration of an iSCSI target management table included in a storage system.
Figure 8B:
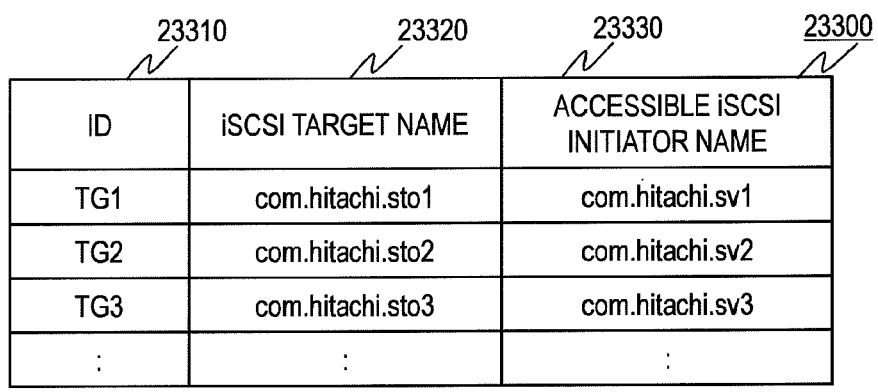
FIG. 8B is a drawing illustrating a configuration of an iSCSI target management table included in a storage system.

FIGS. 8A and 8B are drawings illustrating the iSCSI target management table 23300 owned by the storage system 20000.

The iSCSI target management table 23300 includes a field 23310 for registering target IDs to be the identifiers of iSCSI targets in the storage system, a field 23320 for registering iSCSI target names of the iSCSI targets, and a field 23330 for registering iSCSI initiator names to be the identifiers of the ports in the host computers which are permitted to access to the volumes belonging to the iSCSI targets.

FIG. 8A shows an example of a set of specific values in the iSCSI target management table owned by a storage system, which indicates an iSCSI target HG1 in the storage system has an iSCSI target name of com.hitachi.sto1 and is accessible from the ports having the iSCSI initiator names of com.hitachi.sv1 and com.hitachi.sv11 in the host computers.

FIG. 9 is a drawing illustrating a configuration of the I/O port management table 23400 owned by the storage system 20000.

The I/O port management table 23400 includes a field 23410 for registering port IDs to be the identifiers of the ports in the storage system and a field 23420 for registering MAC addresses to be the identifiers of the ports in the network 45000.

FIG. 9 shows an example of a set of specific values in the I/O port management table owned by a storage system, which indicates a port PORT1 in the storage system is used by iSCSI targets indicated by the iSCSI target IDs of TG1 and TG2.

FIG. 10 is a drawing illustrating a configuration of the RAID group management table 23500 owned by the storage system 20000.

The RAID group management table 23500 includes a field 23510 for registering RAID group IDs to be the identifiers of RAID groups in the storage system, a field 23520 for registering RAID levels of the RAID groups, and a field 23540 for registering the capacities of the RAID groups.

FIG. 10 shows an example of a set of specific values in the RAID group management table owned by a storage system, which indicates a RAID group RG1 in the storage system is configured as the RAID level of RAID 1 and has a capacity of 100 GB.

FIG. 11 is a drawing illustrating a configuration of the disk drive management table 23600 owned by the storage system 20000.

The disk drive management table 23600 includes a field 23610 for registering disk drive IDs to be the identifiers of disk drives in the storage system and a field 23620 for registering the disk types of the disks.

FIG. 11 shows an example of a set of specific values in the disk drive management table owned by a storage system, which indicates the disk type of the disk drive DISK1 in the storage system is FC disk.

FIG. 12 is a drawing illustrating a configuration of the event management table 33100 owned by the management computer 30000.

The event management table 33100 includes a field 33110 for registering event IDs to be the identifiers of the events themselves, a field 33120 for registering apparatus IDs to be the identifiers of the apparatuses to which the events, such as a change in acquired configuration information, have occurred, a field 33130 for registering the identifiers of the components in the apparatuses to which the events have occurred, a field 33140 for registering the types of the events which have occurred, a field 33150 for registering whether the events have been processed by the event propagation model expansion module 32500 as will be described later, a field 33160 for registering the dates and times when the events have occurred, and a field 33170 for registering the periods in which the events are subjected to later-described processing by the event propagation model expansion module 32500 (or subjected to cause analysis by the management program).

For example, the first line (first entry) of FIG. 12 indicates that the management computer 30000 detects an abnormal state in a logical volume indicated by "E:" in the host computer HOST1 and the event ID is EV1.

FIGS. 13A and 13B are drawings illustrating a configuration of an event propagation model in the event propagation model repository 33200 owned by the management computer 30000. An event propagation model used in an error analysis to determine the root cause is configured to describe a set of events which are expected to occur as results of some fault and the root cause in an IF-THEN format. The event propagation model is not limited to those shown in FIGS. 13A and 13B but may have more rules therein. Of course, the event propagation model repository 33200 may include a plurality of event propagation models.

The event propagation model includes a field 33210 for registering a model ID to be the identifier of the event propagation model, a field 33220 for registering monitored event types corresponding to the IF part of the event propagation model described in an IF-THEN format, and a field 33230 for registering a causative event type corresponding to the THEN part of the event propagation model described in the IF-THEN format. They are in a relationship such that if the status of the consequent part became normal, the problem in the condition part would have been solved.

FIG. 13A shows an example of a set of specific values in a event propagation model owned by the management computer, which indicates that, in the event propagation model indicated by the model ID of Rule1, when an abnormal state in a logical volume in a host computer and an abnormal state in a volume in a storage system are detected as the monitored event types, the cause is concluded to be a failure in a volume in a storage system.

It should be noted, as shown in FIG. 13B, the event propagation model may have a monitored event type of "a failure in a volume in a storage system", which is determined to be the consequence of a different event propagation model.

FIGS. 14A to 14E are drawings illustrating a configuration of the law-of-causality matrix 33300 owned by the management computer 30000.

The law-of-causality matrix 33300 includes the following information:

A field 33310 for registering event propagation model IDs to be the identifiers in the event propagation model repository 33200 used in expansions.

A field 33320 for registering information to identify the events detected by the apparatus information acquisition module 32200 in the management computer (in the drawings, the identifiers of the managed objects (or the apparatus IDs and the component IDs) and the event types).

A field 33330 for registering information to register the causative events concluded to be the causes of the errors by the event analysis module 32400 at the detection of the above-described events (in the drawings, the identifiers of the managed objects (or the apparatus IDs and the component IDs) and the event types).

A field 33340 for registering relationships (or causal relations) indicating, which reported event is associated with which route cause by determination based on the event propagation models described in the event propagation model repository 33200 in an "IF-THEN" format.

FIG. 14A shows an example of a set of specific values in the law-of-causality matrix owned by the management computer, which indicates that, when the apparatus information acquisition module detects an event of an abnormal state of the volume (VOL1) in the storage system SYS1 and an event of an abnormal state of the logical volume "E:" in the host computer HOST1, the event analysis module concludes that a failure in the volume (VOL1) in the storage system SYS1 is the root cause.

It should be noted that the law-of-causality matrix may have a data structure in which the size of the matrix can be dynamically changed in order to effectively add or delete a causal relation, as will be described later. For example, the law-of-causality matrix may be divided into sub-matrices by some given number of lines or rows and the sub-matrices may be linked by pointers or indices to show virtual matrices. For the law-of-causality matrix, a matrix structure may be created using continuous areas of the storage resources.

FIGS. 15A and 15B are drawings illustrating a configuration of topology creation method information (also referred to as topology creation method, in short) in the topology creation method repository 33400 owned by the management computer 30000.

The topology creation method is information that defines means to create a connection relation (topology) between a plurality of apparatuses to be monitored based on the configuration information acquired from the managed apparatuses by the management computer. The topology creation method includes a field 33410 for registering a topology ID to be the identifier of the topology, a field 33420 for registering the type of the component in the managed apparatus to be the starting point in creating the topology, a field 33430 for registering the type of the component to be the terminal point in creating the topology, a field 33440 for registering the type of the component to be a transit point in creating the topology between the starting component and the terminal component, and a field 33450 for registering a method of creating the topology from the starting component to the terminal component.

FIG. 15A shows an example of a set of specific values in a topology creation method owned by the management computer, which indicates that the topology starting from a volume in a storage system and terminating at a logical volume in a host computer can be obtained by searching for a combination in which the iSCSI initiator name of the logical volume is the same as the accessible iSCSI initiator name of the iSCSI target and the iSCSI target ID in the volume is the same as the ID of the iSCSI target.

Figure 16:
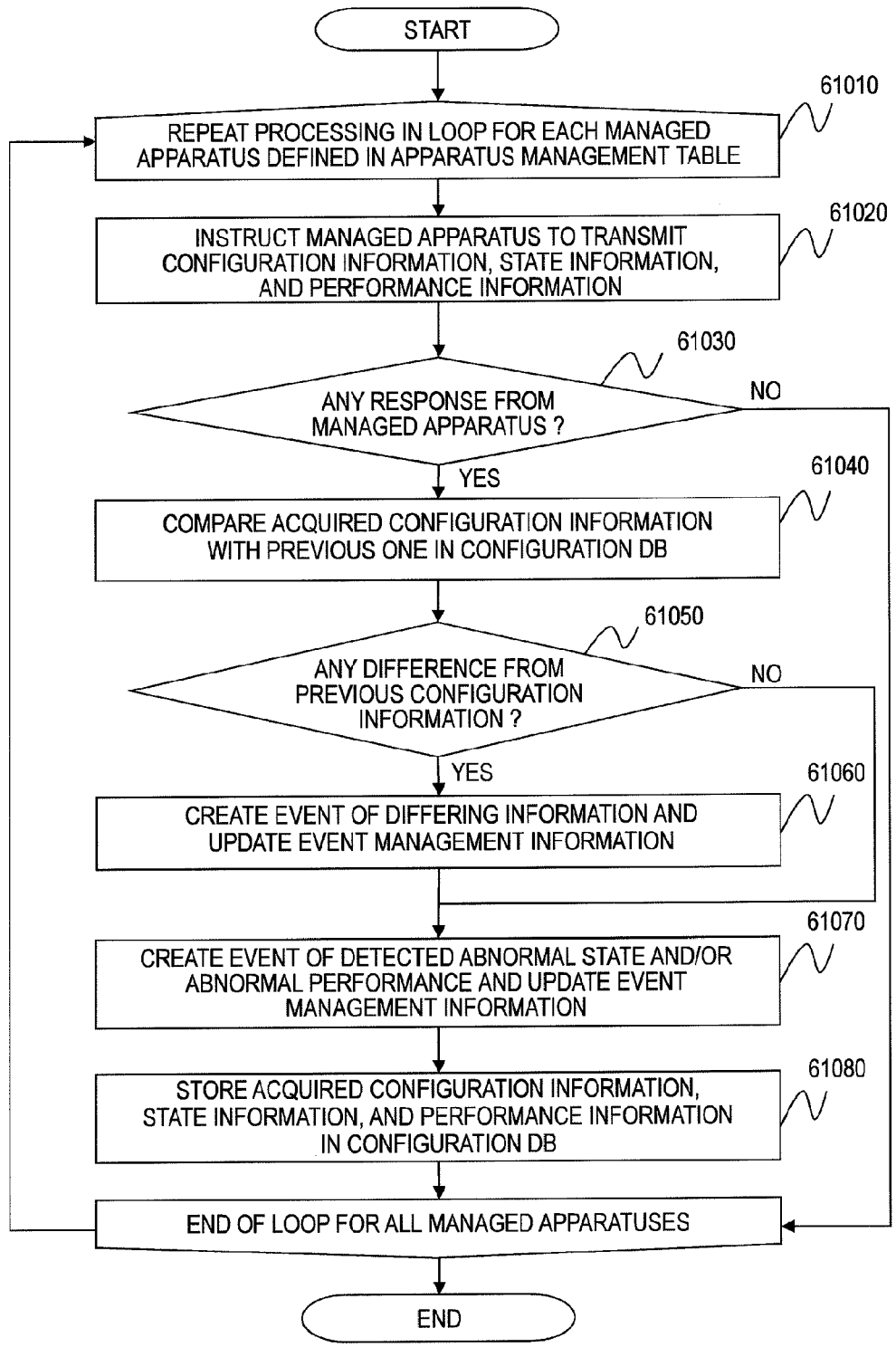
FIG. 16 is a flowchart illustrating an overall flow of acquisition of apparatus information performed by a management computer.

FIG. 16 is a flowchart of acquisition of apparatus information, which is performed by the apparatus information acquisition module 32200 in the management computer 30000.

The management module 32100 instructs the apparatus information acquisition module 32200 to execute the acquisition of apparatus information at the activation of a program or every time a predetermined time has passed since the last acquisition of apparatus information. In the case where it repeatedly issues such instructions, it is not necessary to issue the instructions with strict time intervals, but it is sufficient if it issues the instructions repeatedly. The information to be acquired from an apparatus includes configuration information, state information, and performance information on the apparatus; they may be acquired individually at different times.

The apparatus information acquisition module 32200 repeats the series of processing described below for each of one or more managed apparatuses (step 61010).

The apparatus information acquisition module 32200 instructs the managed apparatus to transmit the configuration information, the state information, or the performance information on the apparatus (step 61020).

If it receives a response from the apparatus (step 61030), the apparatus information acquisition module 32200 compares the acquired configuration information with the previous configuration information held in the configuration DB 33500 (step 61040). If it does not receive a response from the apparatus, it terminates the acquisition of configuration information.

If, as a result of comparison of the acquired apparatus information with the previous one held in the configuration DB, the apparatus information acquisition module 32200 finds any item differing from the previous information (step 61050), it creates an event of the differing item and updates the event management table 33100 (step 61060).

Next, the apparatus information acquisition module 32200 creates an event of an abnormal state or abnormal performance detected in acquiring state information or performance information and updates the event management table 33100 (step 61070). Then, the apparatus information acquisition module 32200 stores the acquired configuration information in the configuration DB 33500 (step 61080).

Explained hereinabove is the acquisition of apparatus information performed by the apparatus information acquisition module 32200. It is not necessary to inform the module that expands or deletes a causal relation of a configuration change (or of the start of execution of the module) by means of an event. An example of the creating an event based on the state information is, when a status of a component has changed into one other than the normal, creating an event (information) corresponding to the status after the change. An example of the creating an event based on the performance information is creating an event (information) when a performance value has reached an abnormal value with reference to a predetermined evaluation criterion (such as a threshold).

Figure 19:
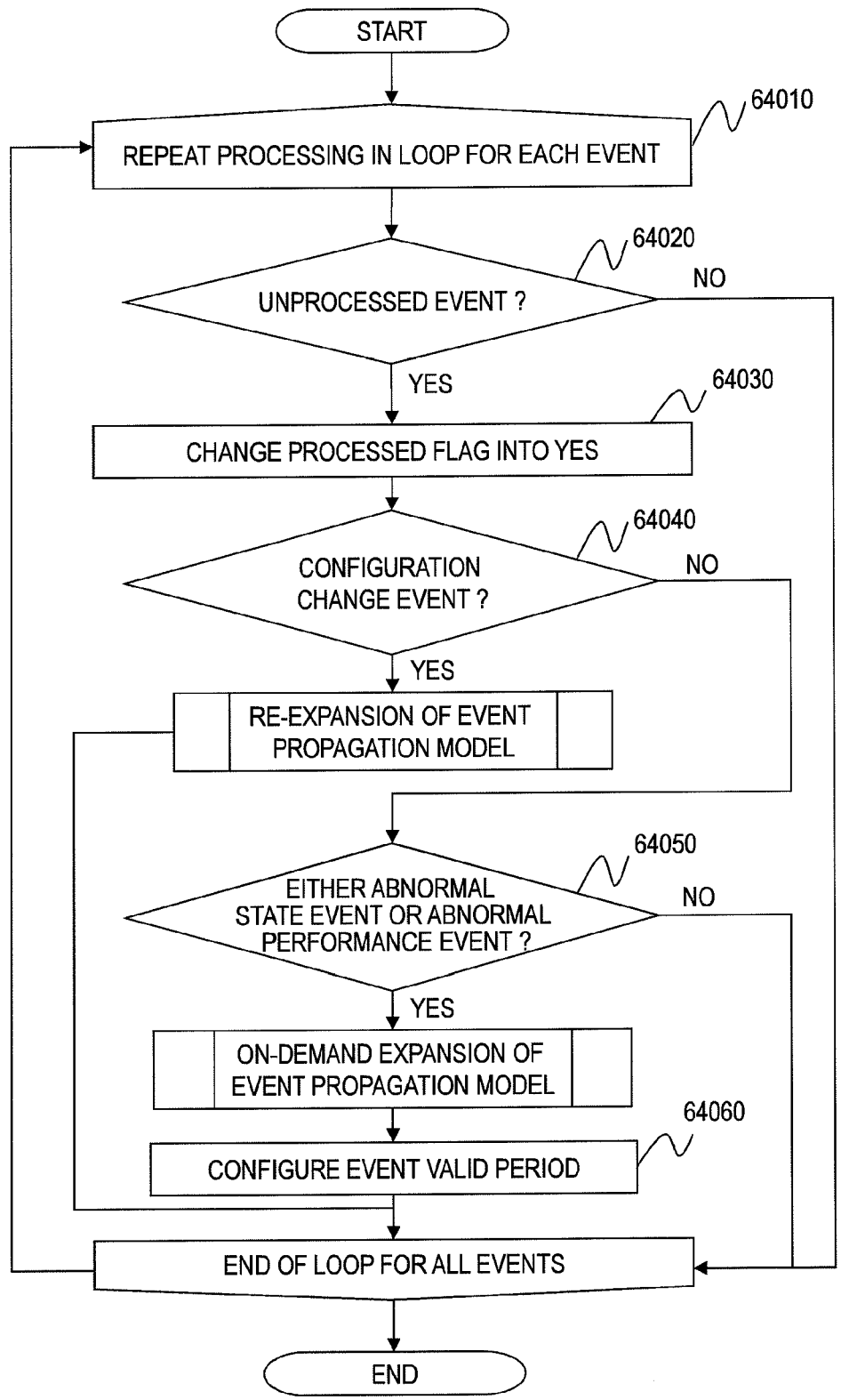
FIG. 19 is a flowchart illustrating an overall flow of checking events performed by a management computer.
Figure 20:
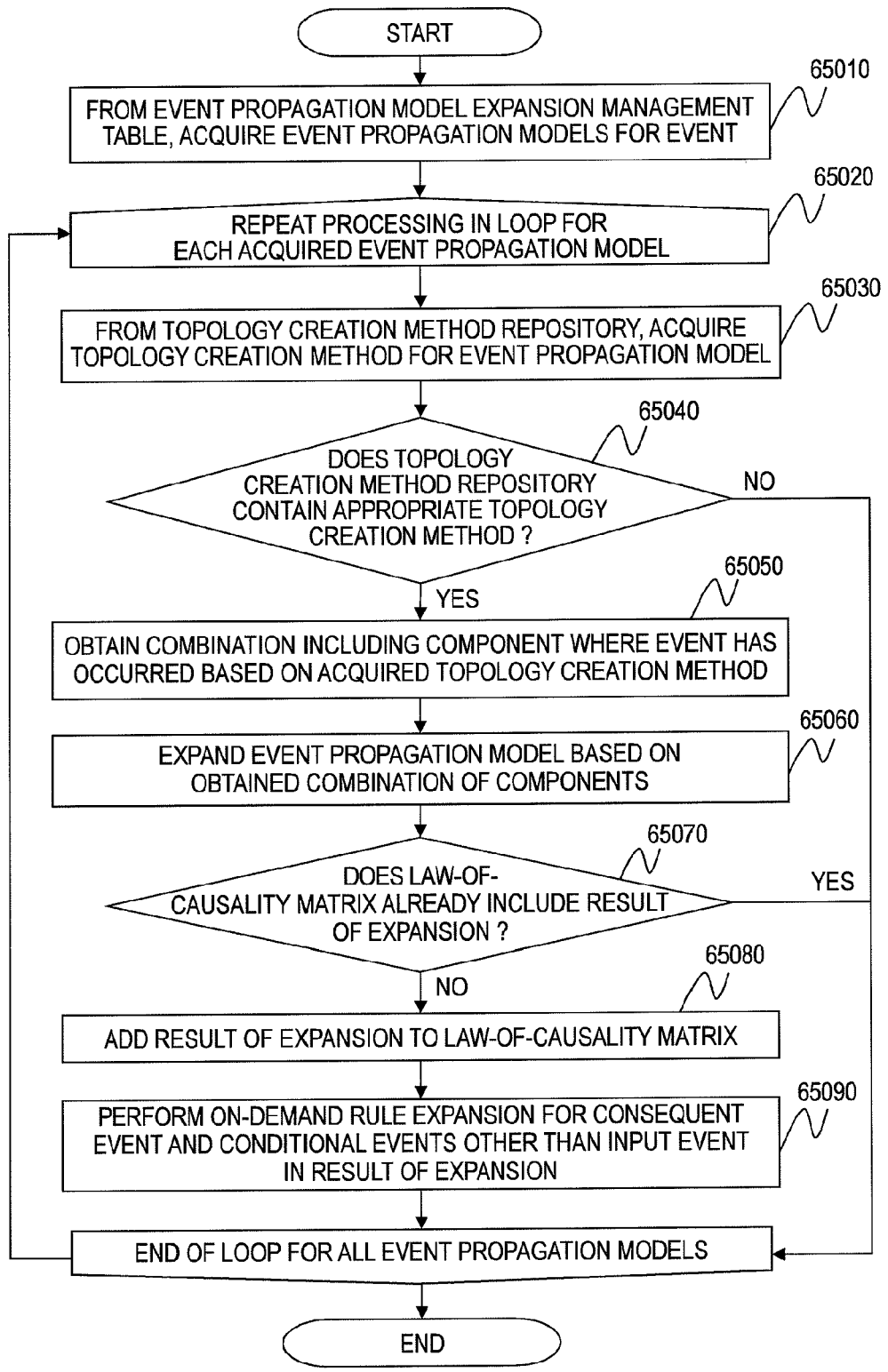
FIG. 20 is a flowchart illustrating an overall flow of on-demand expansion of event propagation models performed by a management computer.
Figure 21:
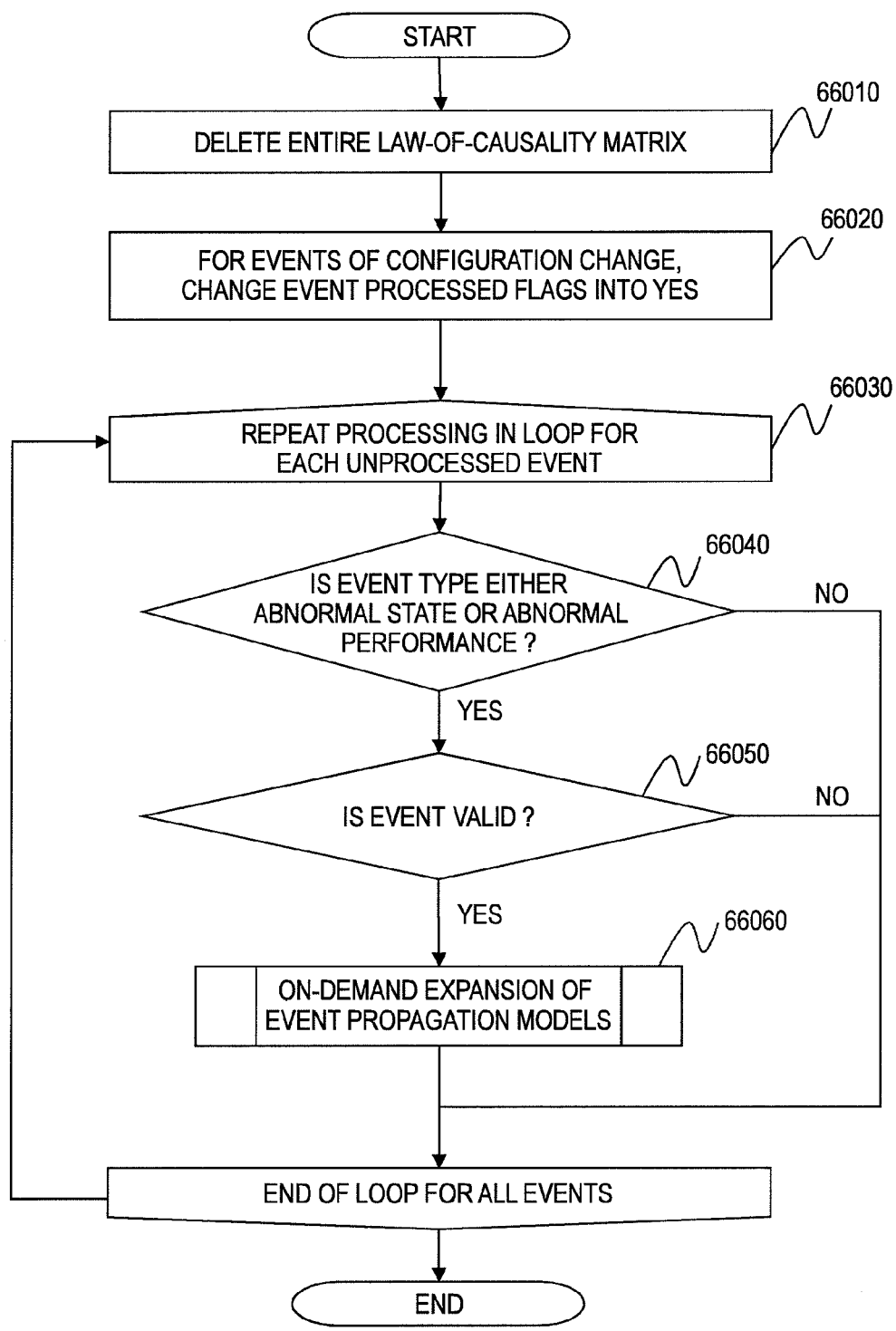
FIG. 21 is a flowchart illustrating an overall flow of re-expansion of event propagation models performed by a management computer.

Next, the event propagation model expansion management table 33600 owned by the management computer 30000 is illustrated in FIG. 18 and processing methods executed by the management computer 30000 are illustrated in FIGS. 19, 20, and 21.

FIG. 18 is a drawing illustrating an example of the event propagation model expansion management table 33600 owned by the management computer 30000.

The event propagation model expansion management table 33600 includes a field 33610 for registering the types of the apparatuses to which the acquired configuration change events have occurred, a field 33620 for registering the types of the components in the apparatuses to which the events have occurred, a field 33630 for registering the types of the events, a field 33640 for registering event propagation models to be expanded when the event analysis module 32500 processes the events, which will be described later.

FIG. 18 shows an example of a set of specific values in the event propagation model expansion management table owned by the management computer, which indicates that Rule1 should be re-expanded when an event of an abnormal state has occurred to a logical volume in a host computer.

FIG. 19 illustrates a flowchart of checking events, which is performed by the event analysis module 32400 in the management computer 30000. After the apparatus information acquisition module 32200 in the management computer 30000 executes the acquisition of apparatus information from the managed apparatuses as illustrated in FIG. 16, it instructs the event analysis module 32400 to check events.

Referring to the event management table 33100, the event analysis module 32400 repeats the processing in the loop to each event defined in the event management table (step 64010). The event analysis module 32400 ascertains whether a processed flag for the event defined in the event management table indicates No (step 64020). If the processed flag for the event indicates No, which means the event is unprocessed, the event analysis module 32400 performs steps 64030 to 64060.

The event analysis module 32400 changes the processed flag for the event defined in the event management table into Yes (step 64030). Next, the event analysis module 32400 ascertains whether the event defined in the event management table is a configuration change event (step 64040). If the event defined in the event management table is a configuration change event, it performs re-expansion of event propagation models illustrated in FIG. 21.

Next, the event analysis module 32400 ascertains whether the event defined in the event management table is either one of an abnormal state event and an abnormal performance event (an event other than a configuration change event) (step 64050). If the event defined in the event management table is an abnormal state event or an abnormal performance event (other than a configuration change event), the event analysis module instructs the event propagation expansion module 32500 to perform on-demand expansion of event propagation models illustrated in FIG. 20 while designating the particular event.

When the on-demand expansion of event propagation models is completed, the event analysis module 32400 configures the event expiration date and time in the event management table (step 64060). The event expiration date and time is calculated by adding a predetermined given time to the time when the event has occurred; however, it may be calculated using a different formula.

Described hereinabove is the checking events performed by the event analysis module 32400. It should be noted that, in the case where the event management table includes a plurality of abnormal state events or abnormal performance events, the event analysis module may instruct the event propagation model expansion module to concurrently perform the on-demand expansion of event propagation models for the plurality of events.

FIG. 20 is a flowchart illustrating the on-demand expansion of event propagation models, which is performed by the event propagation model expansion module 32500 in the management computer 30000.

Referring to the event propagation model expansion management table 33600, the event propagation model expansion module 32500 acquires a list of event propagation models for the event designated at the start of processing (that is to say, one of the unprocessed events) (step 65010).

Next, the event propagation model expansion module 32500 repeats steps 65030 to 65090 for the acquired event propagation models (step 65020). If the event propagation model expansion management table 33600 does not have a registration of the event, the module 32500 terminates the on-demand expansion of event propagation models without performing the subsequent processing.

Then, referring to the topology creation method repository 33400, the event propagation model expansion module 32500 acquires a topology creation method for the event propagation model from the topology creation method repository 33400 (step 65030). If the topology creation method repository does not have an appropriate topology creation method, the module 32500 does not perform the subsequent processing.

If the topology creation method repository contains an appropriate topology creation method (step 65040), the event propagation model expansion module 32500 obtains the topology from the configuration DB 33500 based on the acquired topology creation method (step 65050). The event propagation model expansion module 32500 expands the event propagation model based on the obtained topology (step 65060) and ascertains whether the law-of-causality matrix 33300 already include the result of expansion (step 65070). If the law-of-causality matrix 33300 already includes the result of expansion, the module 32500 does not perform the subsequent processing.

If the result of expansion is not included in the law-of-causality matrix, the event propagation model expansion module 32500 adds a row of the result to the law-of-causality matrix 33300 (step 65080). Next, the event propagation model expansion module 32500 performs the on-demand expansion of event propagation models illustrated in FIG. 20 for the consequent event and the conditional events other than the event designated at the start of the processing in the result of expansion (step 65090).

Described hereinabove is the on-demand expansion of event propagation models performed by the event propagation model expansion module 32500. In the case where topologies are separately held in information other than the configuration DB, the module 32500 may perform the foregoing processing with reference to such information.

FIG. 21 is a flowchart illustrating the re-expansion of event propagation models, which is performed by the event propagation model expansion module 32500 in the management computer 30000.

The event propagation model expansion module 32500 deletes the entire contents of the law-of-causality matrix 33300 (step 66010). Next, it changes the event processed flags for the events classified as configuration change events into Yes (step 66020).

Next, referring to the event management table 33100, the event propagation model expansion module 32500 repeats the processing in the loop for the processed events in the event management table (step 66030).

The event propagation model expansion module 32500 ascertains whether the type of the event is either one of abnormal state and abnormal performance (that is to say, other than configuration change) (step 66040). Next, it ascertains whether the event has been expired (step 66050). If the event has not been expired, the module 32500 performs the on-demand expansion of event propagation models while designating this event (step 66060).

Described hereinabove is the re-expansion of event propagation models performed by the event propagation model expansion module 32500. This flow once deletes all the causal relations and creates new causal relations for the valid events, but, at step 66010, it may delete only the causal relations relating to configuration changes.

Hereinafter, how the processing in Embodiment 1 creates a law-of-causality matrix will be described by way of example of a computer system configured as shown in the information in FIGS. 6 to 13. It is assumed that the iSCSI target management table at the start of the processing is the same as shown in FIG. 8A.

The management module instructs the apparatus information acquisition module to perform the acquisition of apparatus information in response to an instruction of the administrator or in accordance with a schedule with a timer. The apparatus information acquisition module sequentially logs in the managed apparatuses and instructs them to transmit configuration information, state information, and performance information.

Upon completion of the foregoing processing, the apparatus information acquisition module updates the event management table with the acquired state information and performance information. In this example, as indicated in the first line of the event management table of FIG. 12, it is assumed that an abnormal state is detected in a logical volume indicated by "E:" in the host computer HOST1.

When the event analysis module ascertains that the event is an unprocessed event, it instructs the event propagation model expansion module to perform the on-demand expansion of event propagation models while designating the particular event with reference to the event propagation model expansion management table.

The event propagation model expansion module acquires a list of event propagation models for the event. For example, the event propagation model expansion management table of FIG. 18 shows that, when an event of abnormal state occurs to a logical volume in a host computer, the Rule1 should be expanded.

The event propagation model Rule1 in FIG. 13A defines monitored events as "an abnormal state in a logical volume in a host computer" and "an abnormal state of a volume in a storage system". In the meanwhile, the topology creation method of FIG. 15A defines a topology creation method TP1 starting from an I/O port of a storage system and terminating at a logical volume in a host computer. Accordingly, the event propagation model expansion module obtains the topology using this topology creation method.

Referring to (the contents of the configuration DB held in the management computer corresponding to) the volume management table of FIG. 7 and noting the volume VOL1 in the storage system SYS1, the event propagation model expansion module finds that its target ID is TG1. Next, it searches (the contents of the configuration DB held in the management computer corresponding to) the iSCSI target management table of FIG. 8A for the iSCSI target TG1 to ascertain the connected iSCSI initiator name as "com.hitachi.sv1" or "com.hitachi.sv11".

Next, it searches (the contents of the configuration DB held in the management computer corresponding to) the I/O port management table of FIG. 6A for a logical volume indicating the iSCSI initiator name of "com.hitachi.sv1" or "com.hitachi.sv11". Out of the search results of logical volumes "E:" and "F:" in the host computer HOST1, it selects the one having the LUN ID identical to the LUN ID of the volume VOL1 in the storage system SYS1. As a result, a combination of the logical volume "E:" in the host computer HOST1 and the volume VOL1 in the storage system SYS1 is found as one of the topologies including a logical volume of a host computer and a volume of a storage system.

Hence, a pattern is obtained, in which detection of "an abnormal state of the logical volume "E:" in the host computer HOST1" and "an abnormal state of the volume VOL1 in the storage system SYS1" as monitored events leads to the root cause of "a failure in the volume VOL1 in the storage system SYS1", for a result of expansion (namely, a causal relation to be expanded). If this result of expansion is not in the law-of-causality matrix, it adds a row of this result of expansion to the law-of-causality matrix.

After the completion of the foregoing processing, the event propagation module performs the on-demand expansion of event propagation models illustrated in FIG. 20 for the consequent event and the conditional events other than the input event in the result of expansion. In the above-described result of expansion, with respect to the event of "a failure of the volume VOL1 in the storage system SYS1", the event propagation model expansion management table of FIG. 18 teaches the necessity of re-expansion of Rule2. Hence, the event propagation model expansion module re-expands the Rule2 starting from the event of "a failure of the volume VOL1 in the storage system SYS1".

Through the above-described processing, a law-of-causality matrix relating to the event propagation models Rule1 and Rule2 is created as shown in FIGS. 14C and 14D, respectively.

In the meanwhile, the apparatus information acquisition module updates the event management table with reference to previous configuration information held in the configuration DB and the configuration information acquired from the managed apparatuses. In this example, it is assumed that a change is detected in the accessible iSCSI initiator for the iSCSI target indicated by TG1 in the storage system SYS1 as shown in the second line of the event management table of FIG. 12. The iSCSI target management table after the change is shown in FIG. 8B.

Next, the event analysis module changes the processed flag for the event defined in the event management table into Yes. Next, the event analysis module ascertains whether the event defined in the event management table is a configuration change event. If the event defined in the event management table is a configuration change event, the re-expansion of event propagation models is executed.

The event propagation model expansion module deletes the entire contents of law-of-causality matrix and changes the event processed flags for the events classified as configuration change events into Yes. Next, referring to the event management table, the event propagation model expansion module performs the on-demand expansion of event propagation models for the events whose types are abnormal state or abnormal performance and whose valid periods have not been expired.

For example, in the first line of the event management table of FIG. 12, an event is defined as "an abnormal state of a logical volume indicated by "E:" in the host computer HOST1"; the event processed flag indicates Yes; and the event expiration date and time is defined as "2010-01-01 15:30:00". The event propagation model expansion module performs the on-demand expansion of event propagation model starting from the foregoing event. That is to say, it expands the event propagation model Rule1 and adds the result to the law-of-causality matrix. The method of expanding an event propagation model is the same as the method described in the explanation of the on-demand expansion of event propagation models.

Through the above-described processing, the law-of-causality matrix relating to the event propagation model Rule1 is updated from the state of FIG. 14C to the state of FIG. 14E.

Embodiment 2

Embodiment 2 explains another on-demand expansion of event propagation model, which is performed by the event propagation model expansion module 32500 in the management program.

In Embodiment 1, the event propagation model expansion module is instructed to concurrently perform the on-demand expansion of event propagation models for a plurality of events. In an IT system, a single fault propagates to a number of apparatuses so that the management program detects a number of abnormal events at the same time. However, parallel execution of the on-demand expansion of event propagation models for such abnormal events having the same root cause leads to acquisition of the same topology from the configuration DB in plural number at the same time, resulting in wasteful processing and long processing time.

Figure 24A:
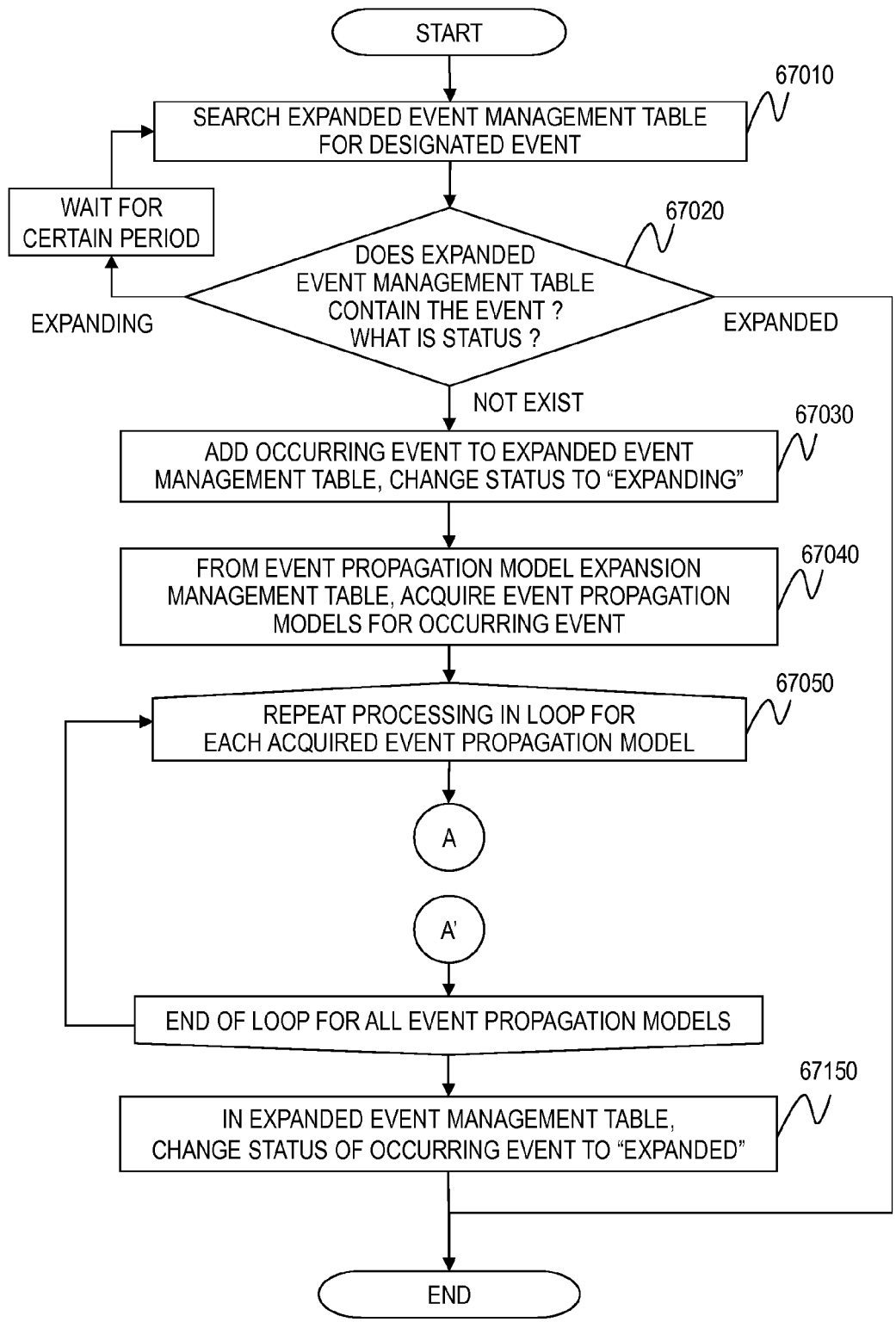
FIG. 24A is a flowchart illustrating an overall flow of on-demand expansion of event propagation models performed by a management computer in Embodiment 2.
Figure 24B:
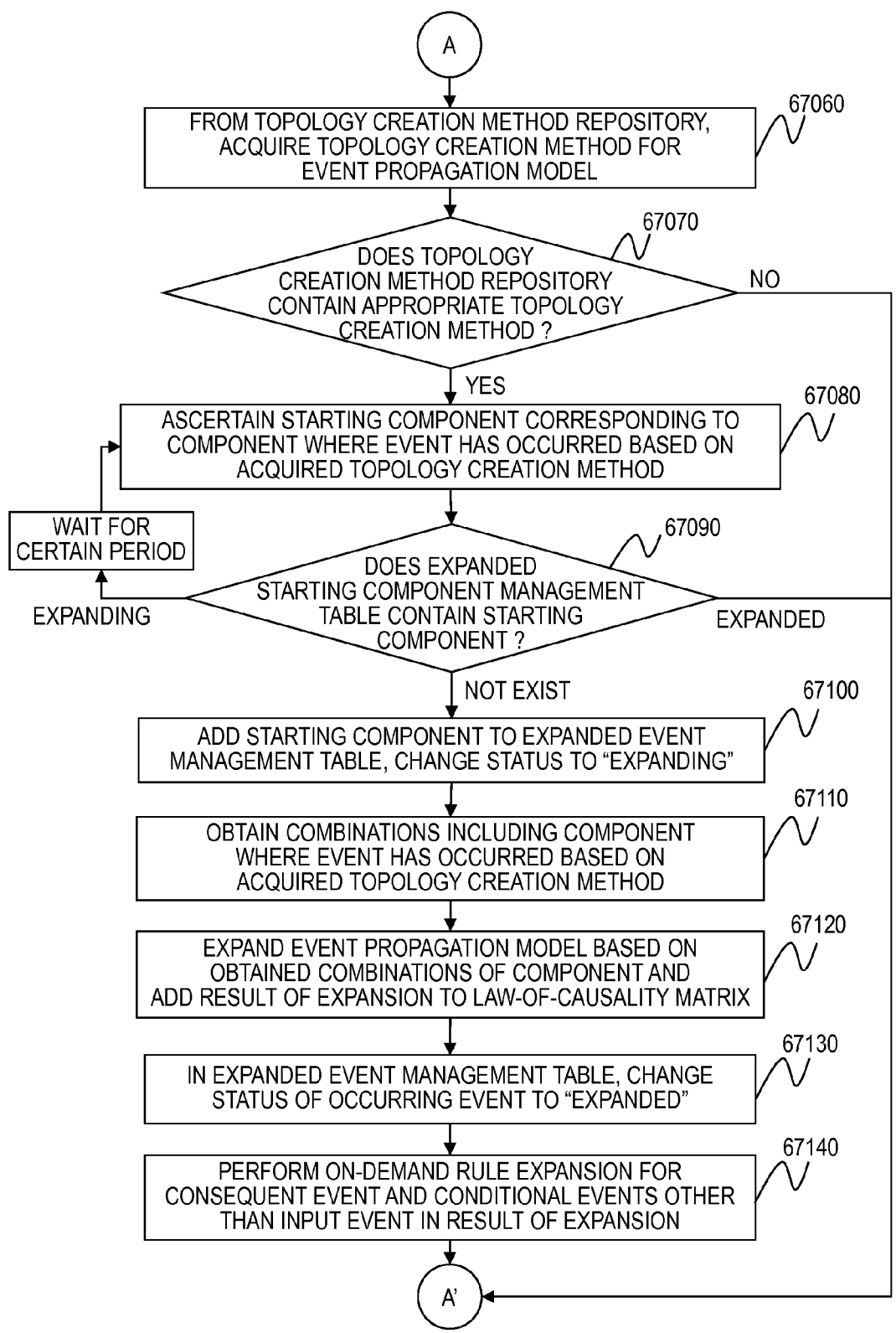
FIG. 24B is a flowchart illustrating an overall flow of on-demand expansion of event propagation models performed by a management computer in Embodiment 2.

To solve the above-described problem, Embodiment 2 modifies the on-demand expansion of event propagation models in the management computer 30000. An expanded event management table 33700 and an expanded starting component management table 33800 are illustrated in FIG. 22 and FIG. 23, respectively, which are owned by the management computer 30000 after the modification, and the processing executed by the management computer 30000 is illustrated in FIGS. 24A and 24B. The others are the same as Embodiment 1.

FIG. 22 is a drawing illustrating a configuration of the expanded event management table 33700 stored in the storage resources in the management computer 30000 in Embodiment 2.

The expanded event management table 33700 includes a field 33710 for registering apparatus IDs to be the identifiers of the apparatuses to which expanded events have occurred, a field 33720 for registering the identifiers of the components in the apparatuses to which the events have occurred, a field 33730 for registering the types of the events, and a field 33740 for registering the status of the expansion triggered by the events.

FIG. 22 shows an example of a set of specific values in the expanded event management table owned by the management computer, which indicates the expansion triggered by an event of an abnormal state in the logical volume "E:" in the host computer HOST1 has been completed.

FIG. 23 is a drawing illustrating a configuration of the expanded starting component management table 33800 stored in the storage resources in the management computer 30000 in Embodiment 2.

The expanded starting component management table 33800 includes a field 33810 for registering apparatus IDs to be the identifiers of the apparatuses in which expanded starting components exist, a field 33820 for registering identifiers of the starting component, a field 33830 for registering IDs of event propagation models expanded with the starting points of the particular components, and a field 33840 for registering the statuses of the expansion triggered by the events.

FIG. 23 shows an example of a set of specific values in the expanded starting component management table owned by the management computer, which indicates the expansion of Rule1 starting from the component of volume VOL1 in the storage system SYS1 has been completed.

The processing method of on-demand expansion of event propagation models performed by the management computer 30000 will be illustrated in FIGS. 24A and 24B. The other processing performed by the management computer 30000 is the same as the one in Embodiment 1.

FIGS. 24A and 24B are flowcharts of the on-demand expansion of event propagation models in Embodiment 2, which is performed by the event propagation model expansion module 32500 in the management computer 30000. The explanation will begin from the processing of FIG. 24A.

The event propagation model expansion module 32500 searches the expanded event management table 33700 for the event designated at the start of the processing (step 67010). If the table contains the event and the status thereof is "EXPANDED", the event propagation model expansion module 32500 terminates the processing without doing anything. If the table contains the event and the status thereof is "EXPANDING", the event propagation model expansion module 32500 waits for a certain period and restarts it. If the expanded event management table 33700 does not contain the event, the event propagation model expansion module 32500 performs the subsequent processing (step 67020).

The event propagation model expansion module 32500 adds the event to the expanded event management table 33700 and changes the status of the event to "EXPANDING" (step 67030). Next, referring to the event propagation model expansion management table 33600, it acquires a list of event propagation models for the event that has occurred (step 67040).

Next, the event propagation model expansion module 32500 repeats the processing from step 67060 to step 67140 in FIG. 24B for each of the acquired event propagation models (step 67050). If no event is registered in the event propagation model expansion management table 33600, the event propagation model expansion module 32500 terminates the on-demand expansion of event propagation models without performing the subsequent processing.

The following description is the explanation of FIG. 24B.

The event propagation model expansion module 32500 refers to the topology creation method repository 33400 to acquire the topology creation method for the event propagation model (step 67060). If the topology creation method repository does not contain the relevant topology creation method, the module 32500 does not perform the subsequent processing.

If the topology creation method repository contains an appropriate topology creation method (step 67070), the event propagation model expansion module 32500 ascertains the starting component corresponding to the component where the event has occurred based on the acquired topology creation method (step 67080).

Next, the event propagation model expansion module 32500 searches the expanded starting component management table 33800 for the starting component (step 67010). If the table 33800 contains the starting component and the status thereof is "EXPANDED", the event propagation model expansion module 32500 terminates the processing without doing anything. If the table 33800 contains the starting component and the status thereof is "EXPANDING", the module 32500 waits for a certain period and restarts it. If the expanded starting component management table 33800 does not contain the starting component, the event propagation model expansion module 32500 performs the subsequent processing described below (step 67090).

The event propagation model expansion module 32500 adds the starting component to the expanded starting component management table 33800 and changes the status of the starting component to "EXPANDING" (step 67100).

The event propagation model expansion module 32500 obtains the topology from the configuration DB 33500 based on the acquired topology creation method and expands an event propagation model based on the obtained topology (step 67110). It adds a row of the result of expansion to the law-of-causality matrix 33300 (step 67120). Next, referring to the expanded starting component management table 33800, it changes the status of the starting component to "EXPANDED" (step 67130).

Next, the event propagation model expansion module 32500 repeats the on-demand rule expansion for the consequent event and the conditional events of the result of expansion other than the event designated at the start of the processing (step 67140).

Described hereinabove is the explanation on FIG. 24B. Now, returning to FIG. 24A, explanation will be continued.

When the processing of event propagation models is finished, the event propagation model expansion module 32500 refers to the expanded event management table 33700 to change the status of the event which has occurred into "EXPANDED" (step 67150).

Hereinafter, how the processing in Embodiment 2 creates a law-of-causality matrix will be described by way of example of a computer system configured as shown in the information in FIGS. 6 to 13.

The management module instructs the apparatus information acquisition module to perform the acquisition of apparatus information in response to an instruction of the administrator or in accordance with a schedule with a timer. The apparatus information acquisition module sequentially logs in the managed apparatuses and instructs them to transmit configuration information, state information, and performance information.

Upon completion of the foregoing processing, the apparatus information acquisition module updates the event management table with the acquired state information and performance information. In this example, as indicated in the fourth line of the event management table of FIG. 12, it is assumed that an abnormal state is detected in a disk drive indicated by DISK1 in the storage system SYS1.

When the event analysis module ascertains that the event is an unprocessed event with reference to the event management table, it instructs the event propagation model expansion module to perform the on-demand expansion of event propagation models while designating the particular event.

The event propagation model expansion module searches the expanded event management table for the event designated at the start of the processing. If the expanded event management table does not include the event, it adds the event to the expanded event management table and changes the status of the event to "EXPANDING".

Next, the event propagation model expansion module acquires a list of event propagation models for the event. For example, the event propagation model expansion management table of FIG. 18 shows that, when an event of an abnormal state occurs to a disk drive in a storage system, the Rule2 should be expanded.

The event propagation model Rule2 in FIG. 13B defines monitored events as "a failure in a volume in a storage system", "an abnormal state in a RAID group in a storage system", and "an abnormal state of a disk drive in a storage system". In the meanwhile, the topology creation method of FIG. 15B defines a topology creation method TP2 starting from a RAID group of a storage system and terminating at a volume in a storage system and a disk drive in a storage system. Accordingly, the event propagation model expansion module obtains the topology using this topology creation method.

Referring to (the contents of the configuration DB corresponding to) the RAID group management table of FIG. 10 and noting the disk drive DISK1 in the storage system SYS1, it is found that the RAID group is RG1. Accordingly, the event propagation model expansion module determines the RAID group of a storage system to be the starting point corresponding to the disk drive DISK1 in the storage system SYS1 is RG1. Next, the event propagation model expansion module searches the expanded starting component management table for a registration of the RAID group RG1 in the storage system SYS1. If the table does not have such a registration, the module newly registers the RAID group with its status "EXPANDING".

Next, the event propagation model expansion module searches (the contents of the configuration DB corresponding to) the volume management table of FIG. 7 for volumes having the RAID group ID of RG1. As a result, it finds that volumes VOL1 and VOL2 exist in the storage system SYS1. As a result, it finds a combination of the disk drive DISK1, the RAID group RG1, and the volume VOL1 in the storage system SYS1 as the topology including a volume, a RAID group, and a disk drive in a storage system.

Hence, a pattern is obtained, in which detection of "an abnormal state of the disk drive DISK1 in the storage system SYS1", "an abnormal state of the RAID group RG1 in the storage system SYS1", and "a failure in the volume VOL1 in the storage system SYS1" as monitored events leads to the root cause of "a failure in the disk drive DISK1 in the storage system SYS1", as the result of expansion. The event propagation model expansion module adds rows of this result of expansion to the law-of-causality matrix.

After the completion of the foregoing processing, the event propagation module performs the on-demand rule expansion for the consequent event and for the conditional events of the result of the expansion other than the input event. In the above-described result of expansion, with respect to the event of "a failure of the volume VOL1 in the storage system SYS1, the event propagation model expansion management table of FIG. 18 teaches the necessity of re-expansion of Rule1. Hence, the event propagation model expansion module performs the re-expansion of Rule1.

Through the above-described processing, a law-of-causality matrix relating to the event propagation models Rule1 and Rule2 are created as shown in FIGS. 14C and 14D, respectively.

Thereafter, in the case where the management program detects an event of "an abnormal state in the disk drive DISK1 in the storage system SYS1" again and the event analysis module instructs the event propagation model expansion module to perform the on-demand expansion of event propagation models while designating this event, the event propagation model expansion module searches the expanded event management table for the event designated at the start of the processing. Since the event exists in the expanded event management table and the status of the event is "EXPANDED", the event propagation model expansion module terminates the on-demand expansion of event propagation models without performing the subsequent process.

Instead of the above situation, in the case where the management program detects an event of "an abnormal state in the disk drive DISK2 in the storage system SYS1" and the event analysis module instructs the event propagation model expansion module to perform the on-demand expansion of event propagation model with designation of this event, the event propagation model expansion module searches the expanded event management table for the event designated at the start of the processing. Since the event does not exist in the expanded event management table, the event propagation model expansion module determines that the event propagation model Rule2 should be expanded with reference to the event propagation model expansion management table.

The event propagation model Rule2 in FIG. 13B defines monitored events as "a failure in a volume in a storage system", "an abnormal state in a RAID group in a storage system", and "an abnormal state of a disk drive in a storage system". In the meanwhile, the topology creation method of FIG. 15B defines a topology creation method TP2 starting from a RAID group of a storage system and terminating at a volume in a storage system and a disk drive in a storage system. Accordingly, the event propagation model expansion module obtains the topology using this topology creation method.

Referring to (the contents of the configuration DB corresponding to) the RAID group management table of FIG. 10 and noting the disk drive DISK2 in the storage system SYS1, it is found that the relevant RAID group is RG1. Accordingly, the event propagation model expansion module determines the RAID group of a storage system to be the starting point corresponding to the disk drive DISK2 in the storage system SYS1 is RG1. Next, the event propagation model expansion module searches the expanded starting component management table. Since the RAID group RG1 in the storage system SYS1 exists in the table and the status of the starting component is "EXPANDED", the event propagation model expansion module terminates the on-demand expansion of event propagation models without performing the subsequent processing.

It should be noted, in the case where the computer system includes a plurality of management computers 30000 and the management computers separately take charges of the apparatuses to be managed, such as storage systems 20000, host computers 10000, and management computers 30000, if the expanded event management table 33700 does not contain the event designated at the start of processing, the event propagation model expansion module 32500 in the management computer 30000 searches the expanded event management table in a different management computer for the particular event. If the event exists, the event propagation model expansion module collects lines and rows relevant to the event from the law-of-causality matrix 33300 in the management computer and copies them in its own law-of-causality matrix.

Described hereinabove is the on-demand expansion of event propagation models in this embodiment.

According to this embodiment, before expanding an event propagation model, the management program determines the consequent component relating to a detected event and event propagation models to be expanded and records whether the rules for the consequent component have already been expanded or are being expanded, which prevents the same causal relations from repeatedly being created from the same event propagation model.

As a result, in an analytic engine employing an on-demand expansion method for a large-scale system, even when a number of errors caused by the same failure are detected, efficient law-of-causality matrix expansion operations based on event propagation models can be achieved with lower processing load to the management computer.

Embodiment 3

Embodiment 3 explains expansion of event propagation model performed by the event propagation model expansion module 32500 in the management program.

In Embodiment 1, the management program performs on-demand expansion of event propagation model after receipt of an abnormal event from an apparatus, and performs error analysis after completion of the expansion. Accordingly, there is a problem that the time from the receipt of an event to the start of the error analysis is longer than in a conventional preliminary expansion method. In the meanwhile, for example, as to an event propagation model relating to only physical components in a storage system (such as a port and a disk drive), the topology to be obtained rarely changes to expand the event propagation model, so that re-expansion because of a configuration change is unlikely to be required even if the conventional preliminary expansion method is employed. Accordingly, to promptly start error analysis upon receipt of an event, it is preferable to employ the preliminary expansion method.

Figure 25:
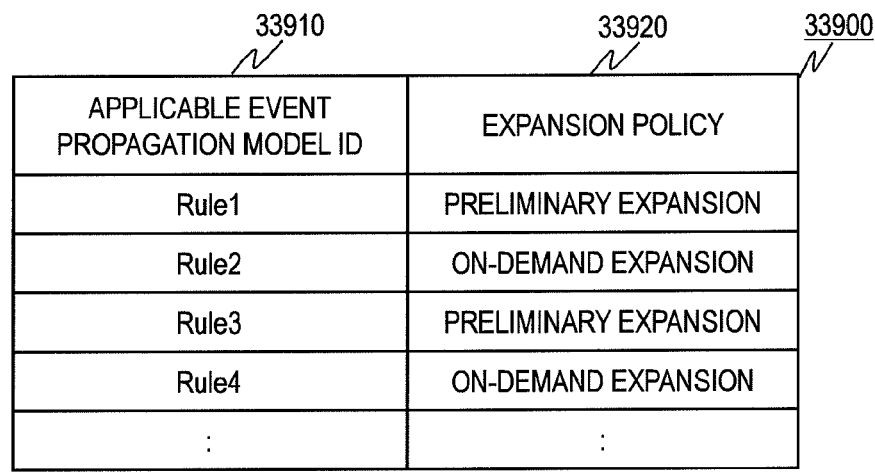
FIG. 25 is a drawing illustrating a configuration an event propagation model management table included in a management computer in Embodiment 3.
Figure 26:
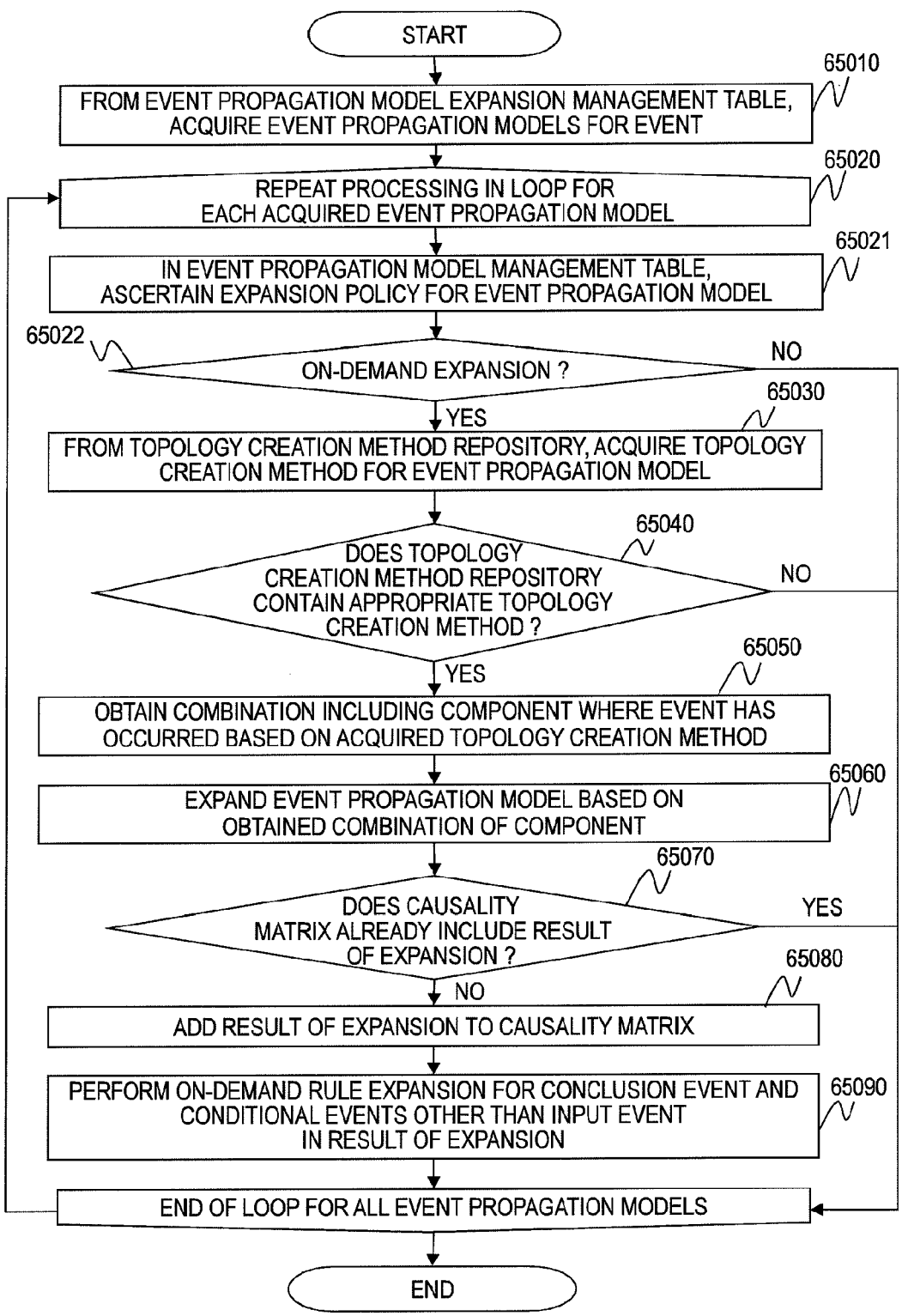
FIG. 26 is a flowchart illustrating an overall flow of on-demand expansion of event propagation models performed by a management computer in Embodiment 3.
Figure 28:
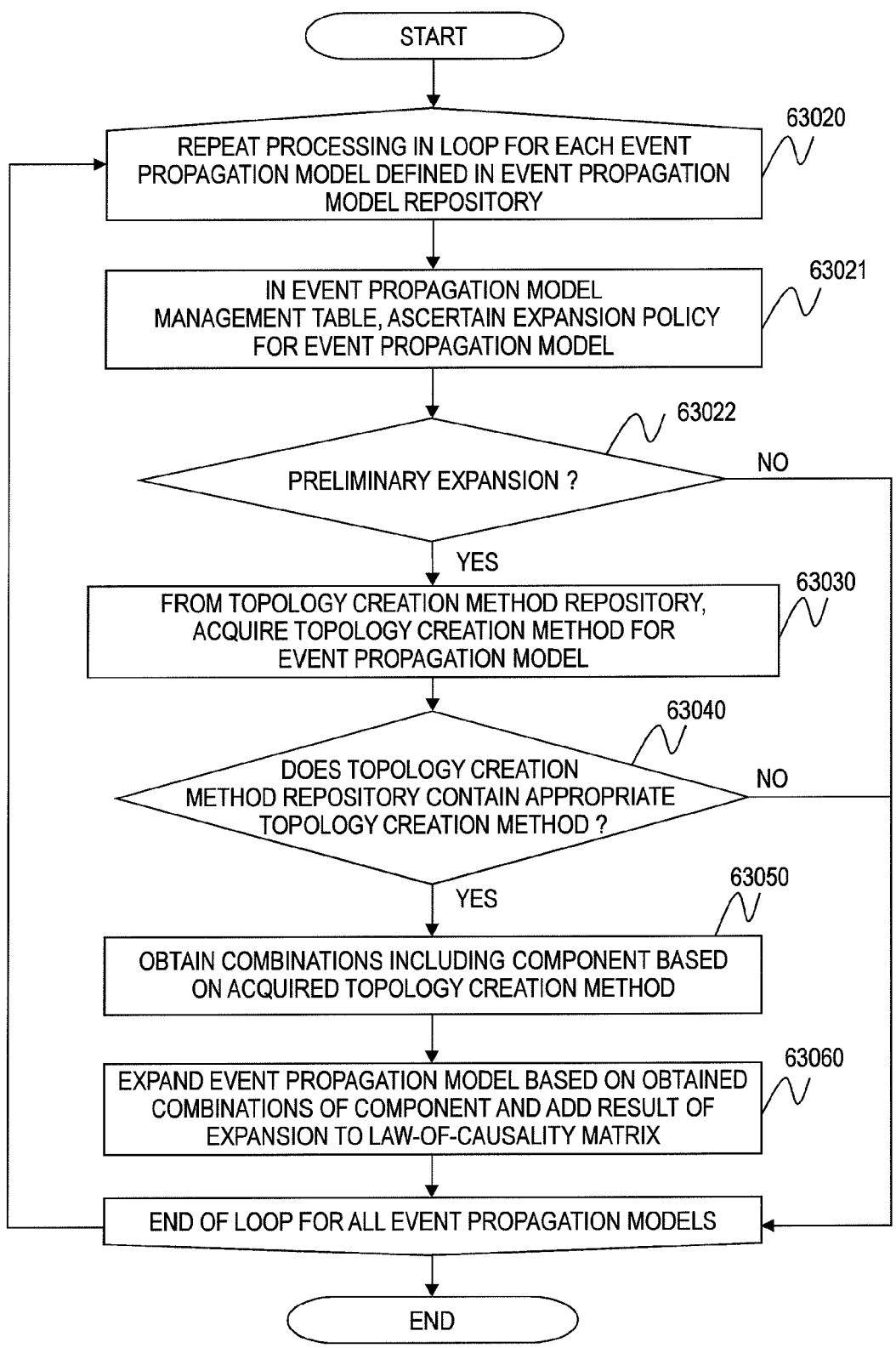
FIG. 28 is a flowchart illustrating an overall flow of re-expansion of event propagation models performed by a management computer in Embodiment 3.

To solve such a problem, Embodiment 3 modifies the on-demand expansion of event propagation models and the re-expansion of event propagation models in the management computer 30000. An event propagation model management table 33900 owned by the management computer 30000 is illustrated in FIG. 25 and the processing flows performed by the management computer 30000 are illustrated in FIGS. 26 to 28. The other information in the management computer 30000 and the other flows are the same as those in Embodiment 1 or 2.

FIG. 25 is a drawing illustrating a configuration of the event propagation model management table 33900 owned by the management computer 30000 in Embodiment 3.

The event propagation model management table 33900 includes a field 33910 for registering event propagation model IDs to be the identifiers of the event propagation models and a field 33920 for registering the methods to be used in expansion of the event propagation models.

FIG. 25 shows an example of a set of specific values in the event propagation model management table owned by the management computer, which indicates that an event propagation model indicated by the event propagation model ID of Rule1 is to be expanded by a preliminary expansion method.

FIG. 26 illustrates a processing method of the on-demand expansion of event propagation modes performed by the management computer 30000. It should be noted that the other processing executed by the management computer 30000 is the same as in Embodiment 1.

FIG. 26 is a flowchart of the on-demand expansion of event propagation model performed by the event propagation model expansion module 32500 in the management computer 30000 in Embodiment 3. The difference from the flow explained using FIG. 20 in Embodiment 1 is that step 65021 and step 65022 have been added. Hereinbelow, only the added parts will be explained.

The event propagation model expansion module 32500 ascertains the expansion method for the event propagation model with reference to the event propagation model management table 33900 (step 65021). If the expansion method is the "on-demand expansion" (step 65022), the module 32500 executes step 65030.

FIG. 28 illustrates a flowchart of expansion of event propagation models performed by the event propagation model expansion module 32500 in the management computer 30000 in Embodiment 3. This processing is performed between step 66020 and step 66030 in FIG. 21, which has been explained in Embodiment 1.

The event propagation model expansion module 32500 repeats steps 63022 to 63060 for all the event propagation models defined in the event propagation model repository 33200 (step 63020).

The event propagation model expansion module 32500 ascertains the expansion method for an event propagation model with reference to the event propagation model management table 33900 (step 63021). If the expansion method is "preliminary expansion" (step 63022), it performs the subsequent processing.

The event propagation model expansion module 32500 acquires the topology creation method for the event propagation model from the topology creation method repository 33400 (step 63030).

If an appropriate topology creation method is in the topology creation method repository (step 63040), the event propagation model expansion module 32500 obtains the topology from the configuration DB 33500 based on the acquired topology creation method (step 63050), expands the event propagation model using the obtained topology, and adds the result to the law-of-causality matrix 33300 (step 63060).

Described hereinabove is the expansion of event propagation models performed by the event propagation model expansion module 32500.

In this embodiment, whether to use the on-demand expansion method or the preliminary expansion method is defined depending on the event propagation model; however, it may be defined depending on the managed apparatus. That is to say, expansion methods can be selectively used; for example, to an important apparatus for which the root cause is required to be determined immediately after an occurrence of an error, the preliminary expansion method is employed and to the other apparatuses, the on-demand expansion method is employed.

As described above, according to this embodiment, either one of the on-demand expansion method described in Embodiment 1 and the preliminary expansion method can be selected for use of each event propagation model in accordance with the policy registered in the event propagation model management table in the management program. Consequently, the two methods can be selectively used depending on the characteristics of the event propagation model or the level of requirement for real-time analysis operation.

What is claimed is:

1. A management computer for managing a plurality of computers to be managed, comprising:
    storage resources holding a management program; and
    a processor for executing the management program,
    wherein the storage resources include:
        (1) topologies indicating relationships among a plurality of managed objects, which are the plurality of managed computers or a plurality of components included in the plurality of managed computers;
        (2) event propagation models, each including a set of information on one or more events and a causal event to cause the one or more events defined with types of events and types of managed objects where events occur, one of the event propagation models indicating that events of type A which occur to managed objects of type 1 cause events of type B to occur to management objects of type 2; and
        (3) causality information including one or more causal relations,
    wherein one of the causal relations indicates that a first event of type A which occurs to a first managed object of type 1 causes a second event of type B to occur to a second managed object of type 2, and
    wherein the management program is configured for the processor to:
        (A) detect an event relating to a problem that has occurred to a managed object;
        (B) determine whether a first causal relation to be used in analysis of the detected event has been created in the causality information;
        (C) perform, in a case where the processor determines that the first causal relation has not been created in (B), an on-demand expansion based on one of the topologies and one of the event propagation models to create the first causal relation in the causality information;
        perform, in a case where the processor determines that the first causal relation is being created in (B), an on-demand expansion based on one of the topologies and one of the event propagation models to create the first causal relation in the causality information; and
        (D) analyze the detected event using the first causal relation.

2. A management computer according to claim 1,
    wherein the storage resources further include (4) event propagation model management information indicating whether to preliminarily create the causal relations each associated with the event propagation models, and
    wherein the management program is configured for the processor to (E) determine, before the management computer detects an event, whether to preliminarily create each of the causal relations based on the event propagation model management information.

3. A management computer according to claim 2,
    wherein the storage resources further include (5) preliminary expansion permission information indicating whether to preliminarily create the causal relations each associated with the managed objects, and
    wherein the management program is configured for the processor to (F) determine, before the management computer detects an event, whether to preliminarily create the causal relation associated with the managed object based on the preliminary expansion permission information.

4. A management computer according to claim 3,
    wherein the storage resources further include (6) an analysis valid period for the detected event, and
    wherein the management program is configured for the processor to (G) delete, after the expiration of the analysis valid period, the first causal relation associated with the detected event from the causality information.

5. A management computer according to claim 4, wherein the management program is configured for the processor to (H) suspend on-demand expansion of other causal relations having the same cause as a causal event indicated by the first causal relation during the on-demand expansion relating to the first causal relation.

6. A management computer according to claim 1, wherein the management program is configured for the processor to:
    determine whether a second causal relation to be used in analysis of an event different from the detected event and included in the first causal relation has been created in the causality information; and
    perform, in a case where the processor determines that the second causal relation has not been created, an on-demand expansion to create the second causal relation.

7. An event analysis method by a management computer which includes storage resources and manages a plurality of computers to be managed, the method comprising:
    storing, in the storage resources:
        (1) topologies indicating relationships among a plurality of managed objects, which are the plurality of managed computers or a plurality of components included in the plurality of managed computers;
        (2) event propagation models, each including a set of information on one or more events and a causal event to cause the one or more events defined with types of events and types of managed objects where events occur, one of the event propagation models indicating that events of type A which occur to managed objects of type 1 cause events of type B to occur to management objects of type 2; and
        (3) causality information including one or more causal relations, one of the causal relations indicating that a first event of type A which occurs to a first managed object of type 1 causes a second event of type B to occur to a second managed object of type 2;

(A) detecting an event relating to a problem that has occurred to a managed object;

(B) determining whether a first causal relation to be used in analysis of the detected event has been created in the causality information;

(C) performing, in a case where the processor determines that the first causal relation has not been created in (B), an on-demand expansion based on one of the topologies and one of the event propagation models to create the first causal relation in the causality information;

performing, in a case where the processor determines that the first causal relation is being created in (B), an on-demand expansion based on one of the topologies and one of the event propagation models to create the first causal relation in the causality information; and (D) analyzing the detected event using the first causal relation.

8. An event analysis method according to claim 7, further comprising:

storing (4) event propagation model management information indicating whether to preliminarily create the causal relations each associated with the event propagation models in the storage resources; and (E) determining, before the management computer detects an event, whether to preliminarily create each of the causal relations based on the event propagation model management information.

9. An event analysis method according to claim 7, further comprising:

storing (5) preliminary expansion permission information indicating whether to preliminarily create the causal relations each associated with the managed objects; and (F) determining, before the management computer detects an event, whether to preliminarily create the causal relation associated with the managed object based on the preliminary expansion permission information.

10. An event analysis method according to claim 7, further comprising:

storing (6) an analysis valid period for the detected event in the storage resources, and (G) deleting, after the expiration of the analysis valid period, the first causal relation associated with the detected event from the causality information.

11. An event analysis method according to claim 7, further comprising (H) suspending on-demand expansion of other causal relations having the same cause as a causal event indicated by the first causal relation during the on-demand expansion relating to the first causal relation.

12. An event analysis method according to claim 7 further comprising:

determining whether a second causal relation to be used in analysis of an event different from the detected event and included in the first causal relation has been created in the causality information; and performing, in a case where it is determined that the second causal relation has not been created, an on-demand expansion to create the second causal relation.

13. A computer system comprising:

a plurality of computers to be managed; and a management computer that includes storage resources and manages the plurality of computers to be managed, wherein the storage resources include:

(1) topologies indicating relationships among a plurality of managed objects, which are the plurality of managed computers or a plurality of components included in the plurality of managed computers;

(2) event propagation models, each including a set of information on one or more events and a causal event to cause the one or more events defined with types of events and types of managed objects where events occur, one of the event propagation models indicating that events of type A which occur to managed objects of type 1 cause events of type B to occur to management objects of type 2; and (3) causality information including one or more causal relations, wherein one of the causal relations indicates that a first event of type A which occurs to a first managed object of type 1 causes a second event of type B to occur to a second managed object of type 2, and wherein the management computer:

(A) detects an event relating to a problem that has occurred to a managed object;

(B) determines whether a first causal relation to be used in analysis of the detected event has been created in the causality information;

(C) performs, in a case where the processor determines that the first causal relation has not been created in (B), an on-demand expansion based on one of the topologies and one of the event propagation models to create the first causal relation in the causality information;

performs, in a case where the processor determines that the first causal relation is being created in (B), an on-demand expansion based on one of the topologies and one of the event propagation models to create the first causal relation in the causality information; and (D) analyzes the detected event using the first causal relation.

14. A computer system according to claim 13, wherein the storage resources further include (4) event propagation model management information indicating whether to preliminarily create the causal relations each associated with the event propagation models, and wherein the management computer (E) determines, before the management computer detects an event, whether to preliminarily create each of the causal relations based on the event propagation model management information.

15. A computer system according to claim 13, wherein the storage resources further include (5) preliminary expansion permission information indicating whether to preliminarily create the causal relations each associated with the managed objects, and wherein the management computer (F) determines, before the management computer detects an event, whether to preliminarily create the causal relation associated with the managed object based on the preliminary expansion permission information.

16. A computer system according to claim 13, wherein the storage resources further include (6) an analysis valid period for the detected event, and wherein the management computer (G) deletes, after the expiration of the analysis valid period, the first causal relation associated with the detected event from the causality information.

17. A computer system according to claim 13, wherein the management computer (H) suspends on-demand expansion of other causal relations having the same cause as a causal event indicated by the first causal relation during the on-demand expansion relating to the first causal relation.

18. A computer system according to claim 13, wherein the management computer:

determines whether a second causal relation to be used in analysis of an event different from the detected event and included in the first causal relation has been created in the causality information; and performs, in a case where it is determined that the second causal relation has not been created, an on-demand expansion to create the second causal relation.

* * * * *